United States Patent
Takakura et al.

(10) Patent No.: US 8,438,222 B2
(45) Date of Patent: May 7, 2013

(54) INFORMATION PROCESSING SYSTEM, INFORMATION PROCESSING APPARATUS, INFORMATION PROCESSING METHOD, AND COMPUTER PROGRAM

(75) Inventors: Hiroki Takakura, Tokyo (JP); Shiro Miyagi, Tokyo (JP); Yoshihiro Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/346,296

(22) Filed: Jan. 9, 2012

(65) Prior Publication Data

US 2012/0110070 A1    May 3, 2012

Related U.S. Application Data

(63) Continuation of application No. 12/968,392, filed on Dec. 15, 2010, now abandoned, which is a continuation of application No. 11/753,246, filed on May 24, 2007, now Pat. No. 7,870,190.

(30) Foreign Application Priority Data

Jun. 5, 2006   (JP) ................................. 2006-155529

(51) Int. Cl.
   *G06F 15/16*   (2006.01)
(52) U.S. Cl.
   USPC ............ 709/203; 709/228; 709/229; 348/148
(58) Field of Classification Search .................. 709/203, 709/228, 229; 348/143
   See application file for complete search history.

(56) References Cited

U.S. PATENT DOCUMENTS

| | | | | |
|---|---|---|---|---|
| 5,995,936 A | * | 11/1999 | Brais et al. | 704/275 |
| 6,483,878 B1 | * | 11/2002 | Yonezawa et al. | 375/240.25 |
| 6,654,683 B2 | * | 11/2003 | Jin et al. | 701/431 |

(Continued)

FOREIGN PATENT DOCUMENTS

| | | |
|---|---|---|
| JP | 9-288445 | 11/1997 |
| JP | 2000-83046 | 3/2000 |

(Continued)

OTHER PUBLICATIONS

Tyler Mitchell, "Introduction Web Mapping-original digital map made by myself", O'Reilly Japan Co., Ltd., 1st edition, May 17, 2006, 45 pages.

(Continued)

*Primary Examiner* — Tesfay Yohannes
(74) *Attorney, Agent, or Firm* — Oblon, Spivak, McClelland, Maier & Neustadt, L.L.P.

(57) ABSTRACT

An information processing system is disclosed. The system includes: a client that executes information display processing; and a server that creates a display structure description file applied in the information display processing, wherein the client acquires image data reference information and transmits display structure description file creating data including the image data reference information to the server, the server creates the display structure description file and transmits the created display structure description file to the client, and the client executes processing for displaying a map on a display unit on the basis of the display structure description file received from the server and acquiring image data from a storage unit within the client on the basis of the image data reference information recorded in the display structure description file and then displaying the acquired image data on the display unit.

14 Claims, 14 Drawing Sheets

U.S. PATENT DOCUMENTS

| | | | |
|---|---|---|---|
| 6,806,974 B1* | 10/2004 | Ueda et al. | 358/1.13 |
| 7,124,094 B1* | 10/2006 | Kobayashi et al. | 705/64 |
| 7,327,383 B2* | 2/2008 | Valleriano et al. | 348/143 |
| 7,739,583 B2* | 6/2010 | Barrus et al. | 715/201 |
| 2001/0023444 A1* | 9/2001 | Torii | 709/228 |
| 2004/0057617 A1* | 3/2004 | Miyawaki et al. | 382/167 |
| 2004/0098342 A1* | 5/2004 | Onishi et al. | 705/51 |
| 2004/0107022 A1* | 6/2004 | Gomez | 700/231 |
| 2004/0174561 A1* | 9/2004 | Fukunaga et al. | 358/1.15 |
| 2004/0193717 A1* | 9/2004 | Tajima et al. | 709/228 |
| 2004/0239681 A1* | 12/2004 | Robotham et al. | 345/581 |
| 2004/0249961 A1* | 12/2004 | Katsube et al. | 709/229 |
| 2005/0080871 A1* | 4/2005 | Dinh et al. | 709/217 |
| 2006/0022048 A1* | 2/2006 | Johnson | 235/462.1 |
| 2006/0206795 A1* | 9/2006 | Hess et al. | 715/500 |
| 2007/0179835 A1* | 8/2007 | Ott et al. | 705/10 |
| 2007/0279438 A1 | 12/2007 | Takakura et al. | |
| 2008/0016145 A1* | 1/2008 | Takase et al. | 709/203 |

FOREIGN PATENT DOCUMENTS

| | | |
|---|---|---|
| JP | 2002-99529 | 4/2002 |
| JP | 2002-158860 | 5/2002 |
| JP | 2005-269104 | 9/2005 |

OTHER PUBLICATIONS

Tetsu Yamato, et al., "Ajax programming started with Google Maps API", PC Japan, Japan, Softbank Createve Co., Ltd., vol. 11, No. 3, Mar. 1, 2006, 9 pages.

Toshikazu Watanabe, "Technology to manage Information and space, it can be done to here! Business GIS", Computer World, Get Technology Right, Japan, IDG Japan Co., Ltd., Jan. 1, 2006, vol. 3, No. 1, pp. 76-83.

* cited by examiner

FIG. 8

| IMAGE FILE PATH | IMAGE CACHE PATH (THUMBNAIL) | IMAGE POSITION INFORMATION (LONGITUDE, LATITUDE) | IMAGE PHOTOGRAPHING DATE AND TIME INFORMATION | OTHER ATTRIBUTE INFORMATION |
|---|---|---|---|---|
| C:¥Doc¥abc¥0001.jpg | C:¥Doc¥pqr¥0001.jpg | (20.43.21, 125.24.45) | 2006.4.21, 12:42:12 | .. |
| C:¥Doc¥abc¥0002.jpg | C:¥Doc¥pqr¥0012.jpg | (23.42.11, 124.23.11) | 2006.5.22, 14:12:05 | .. |
| .. .. | .. .. | .. .. | .. .. | .. .. |
| C:¥Doc¥def¥0321.jpg | C:¥Doc¥stu¥0234.jpg | (21.23.15, 125.43.23) | 2006.5.26, 12:05:51 | .. |

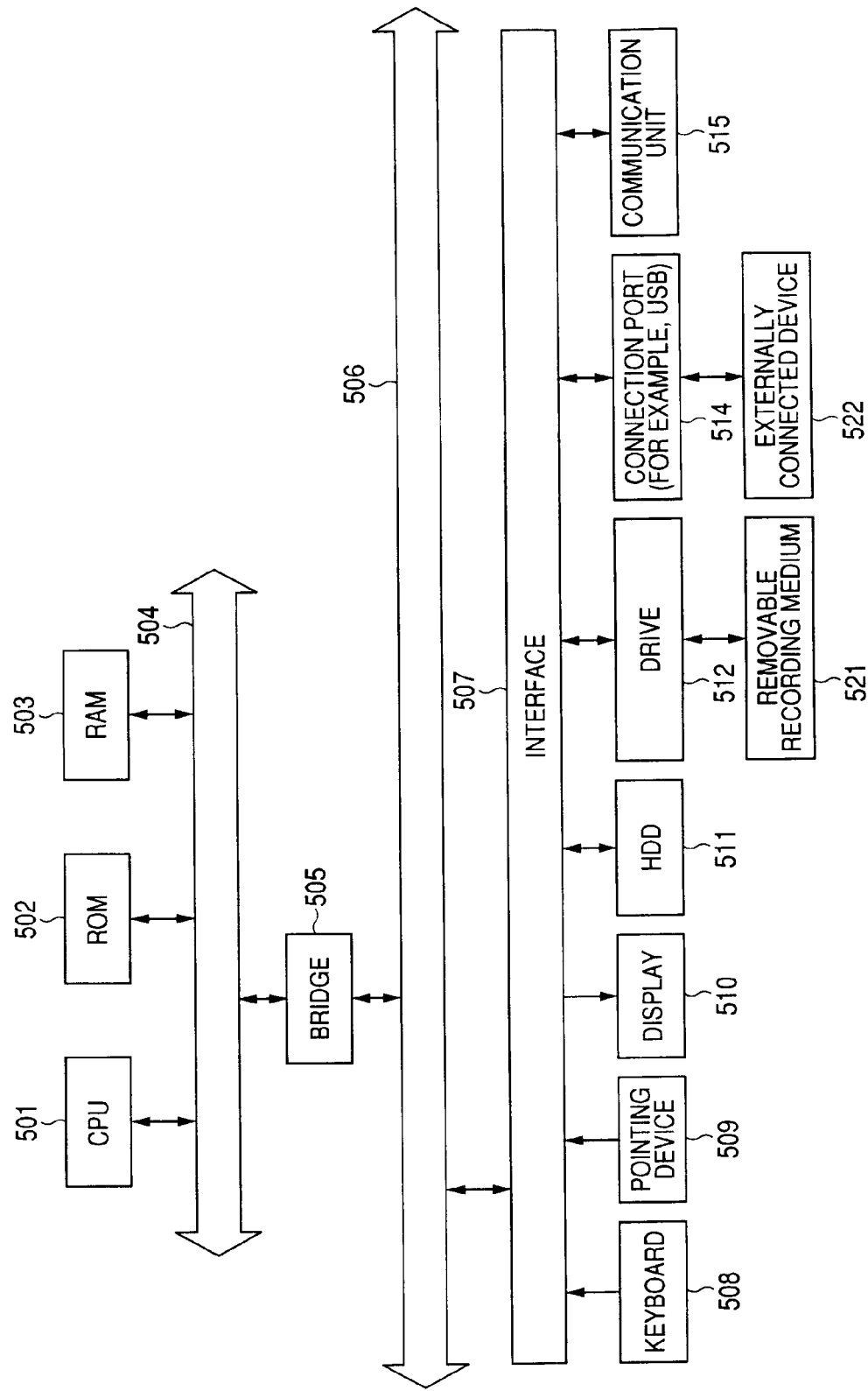

INFORMATION PROCESSING SYSTEM, INFORMATION PROCESSING APPARATUS, INFORMATION PROCESSING METHOD, AND COMPUTER PROGRAM

CROSS REFERENCES TO RELATED APPLICATIONS

This application is a continuation application of U.S. Ser. No. 12/968,392, filed Dec. 15, 2010, which is a continuation application of U.S. Ser. No. 11/753,246, filed May 24, 2007, and contains subject matter related to Japanese Patent Application JP 2006-155529 filed in the Japanese Patent Office on Jun. 5, 2006, the entire contents of each of which are incorporated herein by reference.

BACKGROUND OF THE INVENTION

1. Field of the Invention

The present invention relates to an information processing system, an information processing apparatus, and an information processing method, and a computer program. More specifically, the present invention relates to an information processing system, an information processing apparatus, an information processing method, and a computer program capable of realizing the configuration in which map information, image data held in an information processing apparatus, such as a user's PC or digital camera, and the like are displayed together.

2. Description of the Related Art

In recent years, network communications through Internet or the like are wide spread and various services are provided through the network. A user may acquire various kinds of information from a server, a computer, or the like connected to the network.

For example, there is a map information providing service as one of the services through a network. The map information providing service refers to a service in which a request of map display of, for example, a specific area is transmitted from a user terminal, such as a computer or a portable terminal, connected to a network to a map information providing server and the map information providing server having received the request acquires a map of the area corresponding to the request and then transmits the acquired map to the user terminal. There is also a service that provides a satellite photograph other than a map.

In addition to such map information service, there is a service that allows data that a user holds, for example, image data photographed in travel places to be displayed together at the positions on a map provided by a map providing server.

For example, as shown in FIG. 1, a marker 12 is set on the position corresponding to a place, to which a user has traveled, on a map 10 provided by a map providing server. The marker 12 is a marker for local image pop-up.

An image 11 corresponding to photographs taken by the user is displayed by designating (for example, clicking) each marker. When each of the markers 12a to 12n is clicked, local image data corresponding to each position, for example, the user's image (for example, photograph taken during travel) 11 pops up.

In order to realize such information display, it is necessary to create a display structure description file, which describes the configuration for displaying map data, position information of a marker, and image information such as user's photographs according to a predetermined rule, for example, an HTML file. A user transmits to a service providing server, which provides a service for creating the display data (HTML file), image information such as photographs that the user holds and photographing position (for example, latitude and longitude information) and photographing date and time information corresponding to the image information, the service providing server creates the HTML file on the basis of the transmitted information, and the user acquires the HTML file.

Moreover, in order to allow a map, satellite photographs, and the like, which are shown in FIG. 1, to be displayed together with user's local images so as to be linked to each other, for example, an AJAX (Asynchronous Java (registered trademark) Script+XML) technique is used. The AJAX technique uses an HTTP communication function of Java (registered trademark) script provided in a web browser. The AJAX technique is an interactive web application technique of enabling processing, such as updating of display data, by performing transmission/reception of XML-format data to/from a server without reloading a web page. In addition, the AJAX technique is mainly applied in a network service operating on an Internet browser.

Thus, by applying the AJAX technique, for example, it becomes possible to display an image, such as a user's local photograph, in combination with map or satellite photograph information provided by a map information providing server.

For example, a map information providing server runs business in which the map information providing server enters into license agreements, which grants a right to create an HTML file or an XML file using API (application program interface) for realizing the display data described with reference to FIG. 1, with an external server (service providing server) and then allows utilization of the API of the map information providing server on the basis of a result of checking whether or not the created file is a file created by the licensed service providing server such that the data display service shown in FIG. 1 may be used.

Specifically, the map information providing server issues an API (application program interface) key to the service providing server which is granted a right to create an HTML file or XML file, such that the key information is written in the HTML file or XML file created by the service providing server. Then, only when the key information is confirmed, it is allowed to use the API of the map information providing server, such that the data display processing shown in FIG. 1 is performed. For example, in the case when an HTML file stored in a local place on a personal computer is used, the utilization of the API of the map information providing server is not permitted by the above processing. Accordingly, the data display shown in FIG. 1, that is, an operation of causing a local image to pop up on a map is not possible, and thus service providing based on a license is realized.

Hereinafter, general sequences for executing information display processing on the basis of map information provided by a map information providing server and an HTML file provided by a service providing server will be described with reference to FIG. 2.

A client (user terminal) 31 that executes display of data described with reference to FIG. 1, a service providing server 32 that creates an HTML file, and a map information providing server 33 that provides map information or satellite photograph information are shown from the left side in FIG. 2.

First, under the assumption that the service is executed, the map information providing server 33 gives to the service providing server 32 a permission to create an HTML file for information display using a map, which is provided by the map information providing server 33, and provide the created HTML file to the client. For example, a service during a predetermined period is permitted by license agreements. In this processing, in step S11, the map information providing server 33 creates a key for license and provides the key to the service providing server 32.

Then, in step S12, the client (user terminal) 31 that desires to execute the data display described with reference to FIG. 1 transmits, that is, uploads to a service providing server 12 image data stored in the user terminal, that is, image data, such as photographs taken at tourist spots, and photographing position and photographing date and time information as attribute information of the image data.

In step S13, the service providing server 32 creates an HTML file for data display. This HTML file is a file applied to the data display described above with reference to FIG. 1, and key information received from the map information providing server 33 and codes for utilizing the API provided by the map information providing server 33 are described in the HTML file.

FIG. 3 illustrates the configuration of a part of the HTML file created by the service providing server 32. Key information 52 received from the map information providing server 33 and codes (Java (registered trademark) Script) for utilizing the API provided by the map information providing server 33 are described in a data part 51.

Referring back to FIG. 2, the explanation on the processing sequences continues. In step S14, the service providing server 32 transmits the created HTML file to the client 31. Then, in step S15, the client 31 executes API utilization request with respect to the map information providing server 33 on the basis of the codes (Java (registered trademark) script) for utilizing the API included in the HTML file received from the service providing server 32. In this processing request, position information for indicating the marker position set on a map and the key information 52 included in the data part 51 shown in FIG. 3 are included.

In step S16, the map information providing server 33 verifies the key information in response to the request from the client 31. That is, the map information providing server 33 verifies whether or not the request from the client 31 is a map utilization request based on the HTML file created by the service providing server licensed by the map information providing server 33. Specifically, the map information providing server 33 verifies whether or not effective key information, which is provided to the service providing server licensed by the map information providing server 33, is included in the request from the user terminal. If it is verified that the effective key information is not included, the service stops.

On the other hand, if it is verified that the effective key information is included, in step S17, map data that allows data processing using the API of the map information providing server 33 is provided to the client 31. That is, the map data is map information in which a marker causing a local image to be presented on the map is set.

In step S18, the client 31 displays a map using a browser function, for example. On the map, the markers described above with reference to FIG. 1 are set. In step S19, a marker operation, such as an operation of clicking on a marker, is executed. Then, in step S20, an image acquisition request is transmitted to the service providing server 32, and then in step S21, an image corresponding to the marker is acquired from the service providing server 32. Then, in step S22, an image that pops up on the map is displayed on the user terminal.

The displayed image is the image data that the client 31 transmitted, that is, uploaded to the service providing server 32 in previous step S12.

By executing the processing according to the sequences described above, the client (user terminal) 31 may cause a local image stored in the user terminal to be displayed on the basis of an operation on the marker, which is set at the corresponding position on a map, using the map provided by the map information providing server 33.

That is, as shown in FIG. 4, the client 31 may cause a map 70, on which markers 71a to 71n provided by the map information providing server 33 are set, to be displayed on a display unit of the client 31. In addition, the client 31 may call an image 72, which is transmitted to the service providing server 32 and is then stored therein, by means of an operation of the markers 71a to 71n so as to display the image 72 on a map.

However, as is apparent from the processing sequences described above, in order to use the service, it is necessary for the client (user terminal) 31 to transmit, that is, upload an image stored in the user terminal to the service providing server 32. This, in the case of uploading a user's image file to a service providing server, a load applied to the client (user terminal) and a load applied to the service providing server increase, which causes delay of processing. Moreover, there is a chance that the image file, which is personal information, will leak.

SUMMARY OF THE INVENTION

Therefore, in view of the above, it is desirable to provide an information processing system, an information processing apparatus, an information processing method, and a computer program enabling processing for displaying local image data together with map information provided by, for example, a map information providing server without transmitting local data, such as photographs, stored in a client (user terminal) to an external server or the like.

According to a first embodiment of the present invention, there is provided an information processing system including: a client that executes information display processing; and a server that creates a display structure description file applied in the information display processing. The client acquires image data reference information as access information for image data stored in a storage unit within the client and transmits display structure description file creating data including the image data reference information to the server. The server creates the display structure description file for displaying map information, which corresponds to the display structure description file creating data received from the client, together with image data designated by the image data reference information and transmits the created display structure description file to the client. The client executes processing for displaying a map on a display unit on the basis of the display structure description file received from the server and acquiring image data from the storage unit within the client on the basis of the image data reference information recorded in the display structure description file and then displaying the acquired image data on the display unit.

In the information processing system according to the first embodiment of the present invention, preferably, the display structure description file is an HTML file.

Further, in the information processing system according to the first embodiment of the present invention, preferably, the storage unit within the client is a removable storage means configured to be detachably mounted in an apparatus of the client.

Furthermore, in the information processing system according to the first embodiment of the present invention, preferably, the client transmits position information corresponding to the image data designated by the image data reference information, as the display structure description file creating data, to the server. The server creates a display structure description file including the position information corresponding to the image data received from the client and transmits the created display structure description file to the client. The client executes processing for displaying map information, which includes a marker indicating position information corresponding to the image data, on the display unit on the basis of the display structure description file received from the server and processing for acquiring image data from the storage unit within the client on the basis of the image data reference information recorded in the display structure description file in response to an operation of the marker and displaying the acquired image data on the display unit.

Furthermore, in the information processing system according to the first embodiment of the present invention, preferably, the client acquires reduced image data reference information as access information for reduced images of the image data, which is created on the basis of the image data stored in the storage unit within the client, and transmits display structure description file creating data including the reduced image data reference information to the server. The server creates a display structure description file applied in processing for displaying reduced image data, which is designated by the reduced image data reference information, together with map information on the basis of the display structure description file creating data including the reduced image data reference information received from the client and transmits the created display structure description file to the client. The client executes processing for displaying the map information on the display unit on the basis of the display structure description file received from the server and processing for acquiring the reduced image data from the storage unit within the client on the basis of the reduced image data reference information recorded in the display structure description file and displaying the acquired reduced image data on the display unit.

In addition, in the information processing system according to the first embodiment of the present invention, preferably, the client executes processing for transmitting data included in the display structure description file, which is received from the server, to a map information providing server, acquiring map information from the map information providing server as a response corresponding to the transmission processing, and displaying the acquired map information on the display unit.

Further, according to a second embodiment of the present invention, an information processing apparatus that executes information display processing includes: a storage unit that stores image data; and a data processing unit that executes processing for acquiring image data reference information as access information for the image data stored in the storage unit, acquiring display structure description file creating data including the image data reference information and then transmitting the acquired display structure description file creating data to a server, and displaying map information on a display unit on the basis of a display structure description file received from the server and acquiring image data from the storage unit on the basis of the image data reference information recorded in the display structure description file and then displaying the acquired image data on the display unit.

In the information processing apparatus according to the second embodiment of the present invention, preferably, the display structure description file is an HTML file.

Further, in the information processing apparatus according to the second embodiment of the present invention, preferably, the storage unit is a removable storage means configured to be detachably mounted in the information processing apparatus.

Furthermore, in the information processing apparatus according to the second embodiment of the present invention, preferably, the data processing unit executes processing for transmitting position information corresponding to the image data designated by the image data reference information, as the display structure description file creating data, to the server and processing for displaying map information, which includes a marker indicating position information corresponding to the image data, on the display unit on the basis of the display structure description file received from the server and acquiring image data from the storage unit within a client on the basis of the image data reference information recorded in the display structure description file in response to an operation of the marker and then displaying the acquired image data on the display unit.

Furthermore, in the information processing apparatus according to the second embodiment of the present invention, preferably, the data processing unit executes processing for acquiring reduced image data reference information as access information for reduced images of the image data, which is created on the basis of the image data stored in the storage unit and transmitting display structure description file creating data including the reduced image data reference information to the server and processing for displaying the map information on the display unit on the basis of the display structure description file received from the server and acquiring the reduced image data from the storage unit within a client on the basis of the reduced image data reference information recorded in the display structure description file and then displaying the acquired reduced image data on the display unit.

In addition, in the information processing apparatus according to the second embodiment of the present invention, preferably, the data processing unit executes processing for transmitting data included in the display structure description file, which is received from the server, to a map information providing server, acquiring map information from the map information providing server as a response corresponding to the transmission processing, and displaying the acquired map information on the display unit.

Further, according to a third embodiment of the present invention, an information processing apparatus that creates a display structure description file on the basis of data received from a client includes: a communication unit that receives display structure description file creating data including image data reference information from the client; and a data processing unit that creates the display structure description file applied in processing for displaying image data, which is designated by the image data reference information, together with map information on the basis of the display structure description file creating data including the image data reference information and transmits the created display structure description file to the client through the communication unit.

In the information processing apparatus according to the third embodiment of the present invention, preferably, the display structure description file is an HTML file.

Further, in the information processing apparatus according to the third embodiment of the present invention, preferably, the data processing unit creates a display structure description file including position information corresponding to image data received from the client and transmits the created display structure description file to the client.

Furthermore, in the information processing apparatus according to the third embodiment of the present invention, preferably, the data processing unit creates a display structure description file applied in processing for displaying reduced image data, which is designated by reduced image data reference information received from the client, together with map information on the basis of display structure description file creating data including the reduced image data reference information and transmits the created display structure description file to the client.

Further, according to a fourth embodiment of the present invention, there is provided an information processing method executed in an information processing apparatus including: a data transmitting step in which, in a data processing unit, image data reference information as access information for image data stored in a storage unit is acquired and display structure description file creating data including the image data reference information is acquired and is then transmitted to a server; and a data displaying step in which, in the data processing unit, map information is displayed on a display unit on the basis of a display structure description file received from the server and image data is acquired from the storage unit on the basis of the image data reference information recorded in the display structure description file and is then displayed on the display unit.

In the information processing method according to the fourth embodiment of the present invention, preferably, the display structure description file is an HTML file.

Further, in the information processing method according to the fourth embodiment of the present invention, preferably, in the data transmitting step, position information corresponding to the image data designated by the image data reference information is transmitted as the display structure description file creating data to the server. In the data displaying step, map information including a marker indicating position information corresponding to the image data is displayed on the display unit on the basis of the display structure description file received from the server and image data is acquired from the storage unit within a client on the basis of the image data reference information recorded in the display structure description file in response to an operation of the marker and is then displayed on the display unit.

Furthermore, in the information processing method according to the fourth embodiment of the present invention, preferably, in the data transmitting step, reduced image data reference information is acquired as access information for reduced images of the image data, which is created on the basis of the image data stored in the storage unit and display structure description file creating data including the reduced image data reference information is transmitted to the server. In the data displaying step, the map information is displayed on the display unit on the basis of the display structure description file received from the server and the reduced image data is acquired from the storage unit within a client on the basis of the reduced image data reference information recorded in the display structure description file and is then displayed on the display unit.

In addition, in the information processing method according to the fourth embodiment of the present invention, it is preferable to further include a processing executing step in which, in the processing unit, data included in the display structure description file, which is received from the server, is transmitted to a map information providing server, and map information is acquired from the map information providing server in accordance with the transmission processing to display the acquired map information on the display unit.

Further, according to a fifth embodiment of the present invention, there is provided an information processing method of executing processing based on data received from a client in an information processing apparatus including: a data receiving step in which, in a communication unit, display structure description file creating data including image data reference information is received from the client; and a data processing step in which, in a data processing unit, the display structure description file applied in processing for displaying image data, which is designated by the image data reference information, together with map information is created on the basis of the display structure description file creating data including the image data reference information and the created display structure description file is transmitted to the client through the communication unit.

In the information processing method according to the fifth embodiment of the present invention, preferably, the display structure description file is an HTML file.

Further, in the information processing method according to the fifth embodiment of the present invention, preferably, in the data processing step, a display structure description file including position information corresponding to image data received from the client is created and is then transmitted to the client.

Furthermore, in the information processing method according to the fifth embodiment of the present invention, preferably, in the data processing step, a display structure description file applied in processing for displaying reduced image data, which is designated by reduced image data reference information received from the client, together with map information is created on the basis of display structure description file creating data including the reduced image data reference information and the created display structure description file is transmitted to the client.

In addition, according to a sixth embodiment of the present invention, a computer program that causes an information processing apparatus to execute: a data transmitting step in which, in a data processing unit, image data reference information as access information for image data stored in a storage unit is acquired and display structure description file creating data including the image data reference information is acquired and is then transmitted to a server; and a data displaying step in which, in the data processing unit, map information is displayed on a display unit on the basis of a display structure description file received from the server and image data is acquired from the storage unit on the basis of the image data reference information recorded in the display structure description file and is then displayed on the display unit.

In addition, according to a seventh embodiment of the present invention, a computer program that causes an information processing apparatus to execute processing based on data received from a client, including: a data receiving step in which, in a communication unit, display structure description file creating data including image data reference information is received from the client; and a data processing step in which, in a data processing unit, the display structure description file applied in processing for displaying image data, which is designated by the image data reference information, together with map information is created on the basis of the display structure description file creating data including the image data reference information and the created display structure description file is transmitted to the client through the communication unit.

In addition, the computer program according to the embodiment of the present invention is a computer program that may be supplied to a computer system capable of executing a variety of program codes by the use of a storage medium or a communication medium supplied in a computer-readable format. For example, the computer program may be supplied by the use of a recording medium such as a CD, an FD, and an MO, or a communication medium such as a network. By supplying the program in the computer-readable format, processing corresponding to the program is realized in the computer system.

Additional purposes, characteristics, and advantages of the present invention will be apparent by detailed description made with reference to the accompanying drawings in the following embodiment of the present invention. Furthermore, the system in the specification is a logic group of a plurality of apparatuses. That is, the system in the specification is not limited to a system in which apparatuses having respective configurations exist in the same casing.

According to the configuration according to the embodiment of the present invention, local data, such as a photograph, stored in a client (user terminal) can be displayed together with, for example, map information provided by a map information providing server without transmitting the local data to an external server or the like. A client transmits image file path information, which is not actual data of an image file but access information of the image file stored in a storage unit of the client, to a service providing server that executes HTML file creation processing and acquires an HTML file including the image file path information. The client executes processing for displaying the image file together with the map on the basis of the HTML file including the image file path information. With the configuration described above, the image data that is displayed together with map information on the client side is not read from the service providing server but is read from the client, that is, the storage unit of the client on the basis of the file path information recorded in the HTML file. Therefore, since the client does not need to transmit image data to the service providing server, the processing load is reduced and thus data display processing can be performed quickly.

BRIEF DESCRIPTION OF THE DRAWINGS

FIG. 8 is a view illustrating an example of upload data transmitted from a client to a service providing server;

FIG. 14 is a view explaining an example of the hardware configuration of an information processing apparatus used in the information processing system.

DESCRIPTION OF THE PREFERRED EMBODIMENTS

Hereinafter, an information processing system, an information processing apparatus, an information processing method, and a computer program according to embodiments of the present invention will be described in detail with reference to the accompanying drawings.

Figure 1:
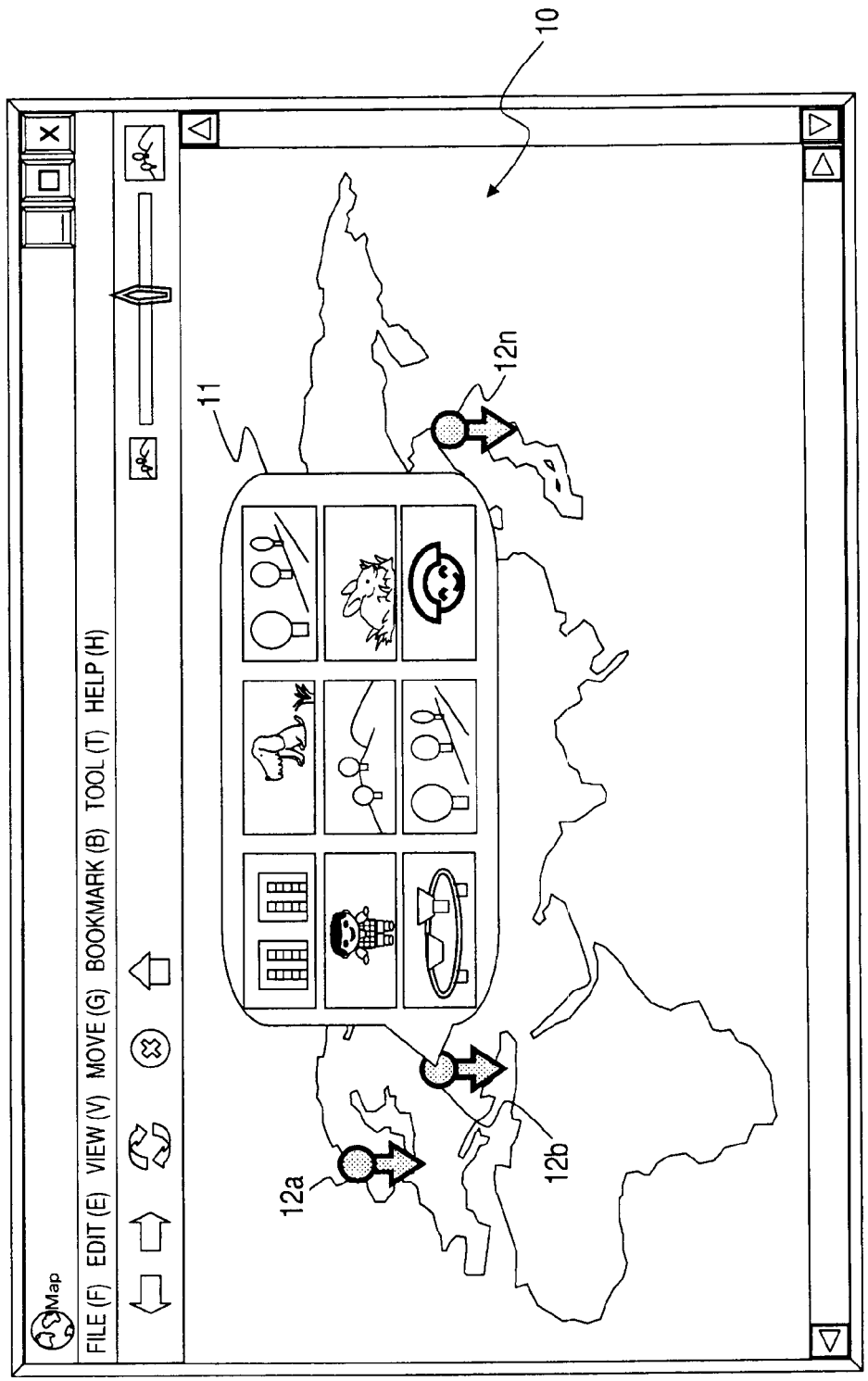
FIG. 1 is a view illustrating an example of display data in which image data that a user holds is displayed together with map information.
Figure 2:
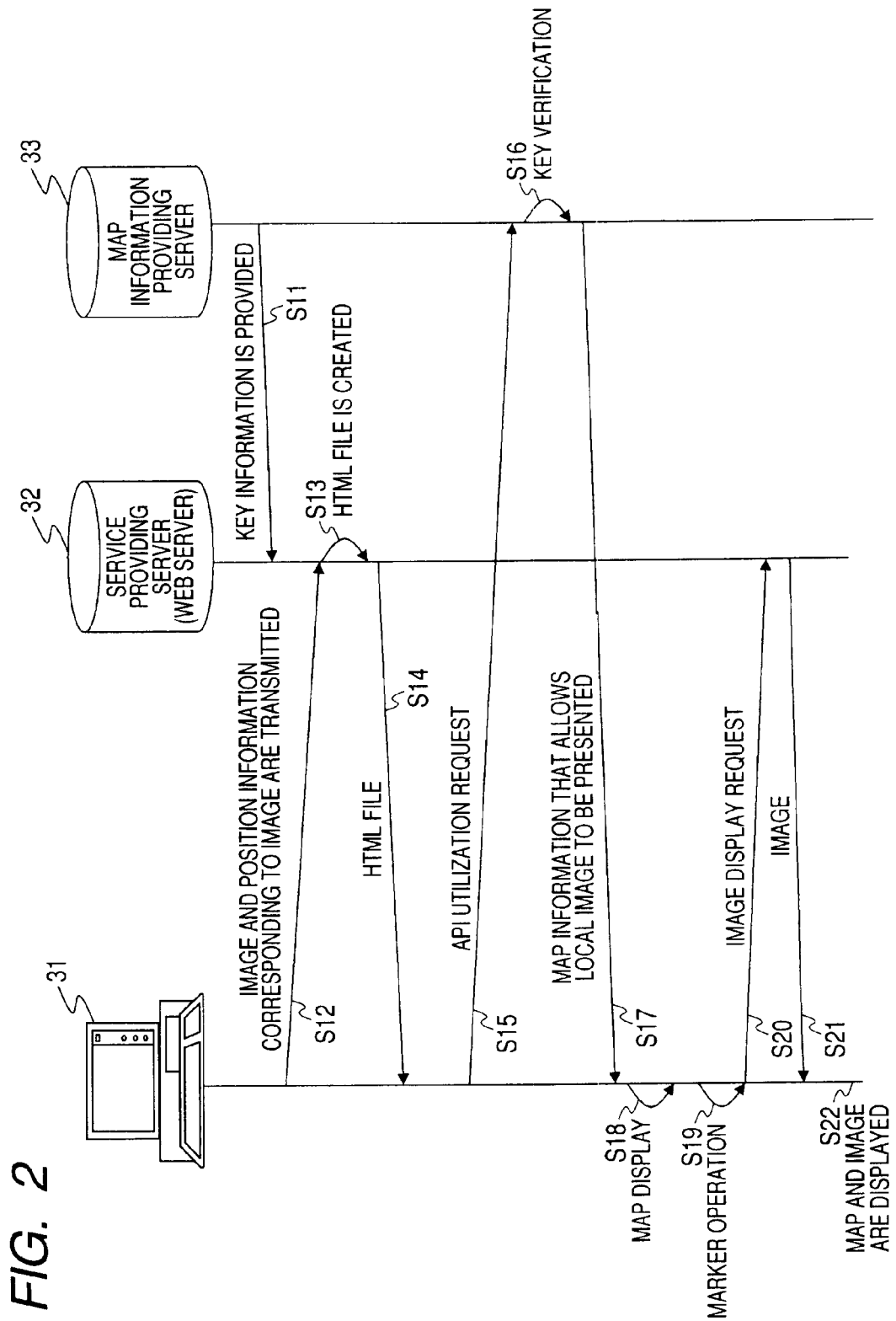
FIG. 2 is a view explaining general sequences for executing information display processing on the basis of map information provided by a map information providing server and an HTML file provided by a service providing server.
Figure 5:
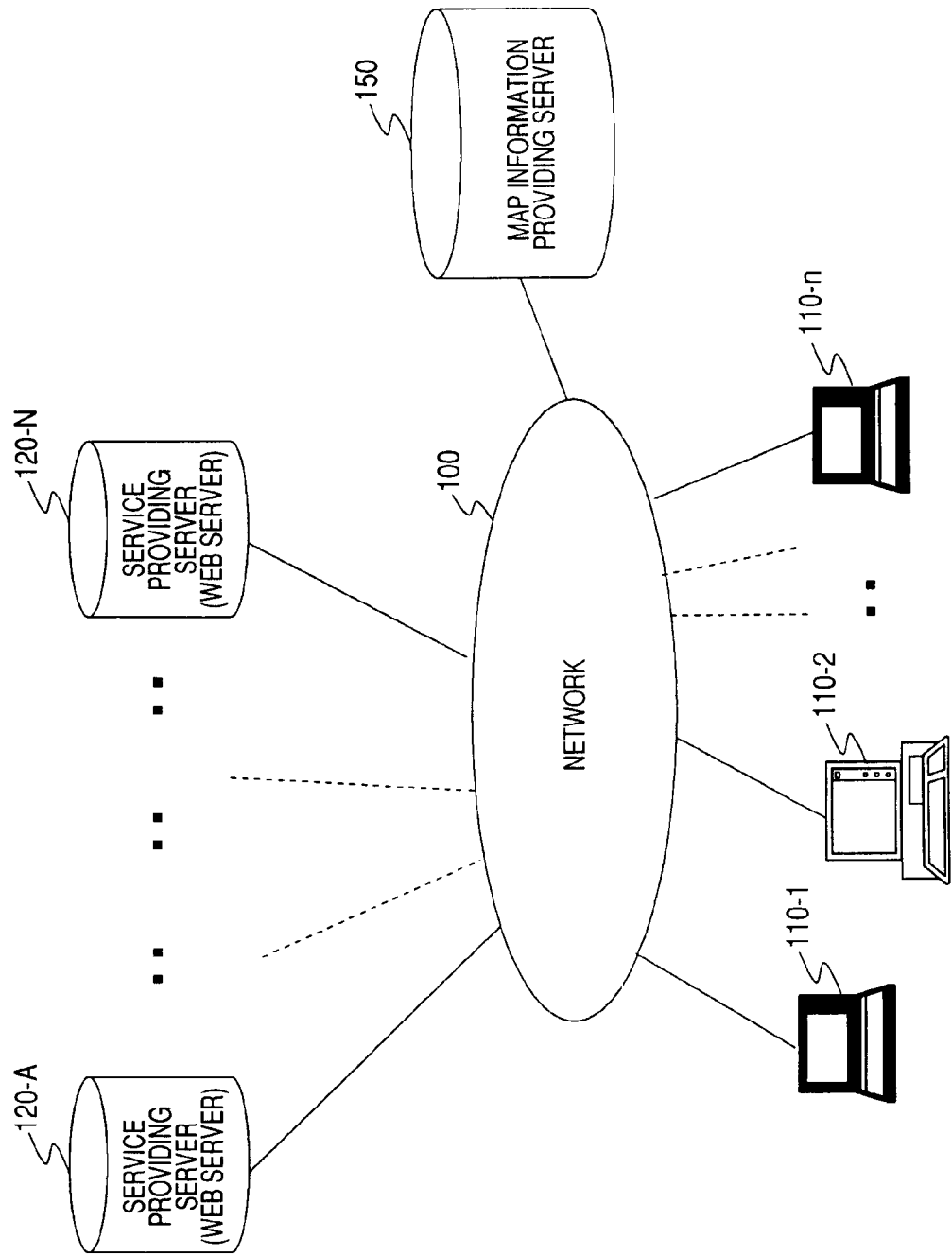
FIG. 5 is a view explaining an example in which an information processing system according to an embodiment of the present invention is used.

First, an example in which an information processing system according to an embodiment of the present invention is used will be described with reference to FIG. 5. A network 100 shown in FIG. 5 is a network, such as Internet and intranet. Service providing servers (web servers) 120-A to 120-N that provide various kinds of services, a map information providing server 150 that provides map information, and clients 110-1 to 110-*n* that perform processing for displaying the display data described above with reference to FIG. 1, that is, processing for displaying local image data, such as photographs, together with map information provided by the map information providing server 150 are connected to the input image signal 100. In addition, maps, satellite photographs, aerial photographs, and the like, that is, various kinds of information serving as maps are included in the map information provided by the map information providing server 150.

The clients 110-1 to 110-*n* serving as user terminals are information processing apparatuses, such as a PC, a digital camera, and a mobile phone. For example, local data including image data, such as photographs taken at tourist spots, are stored in a storage medium, such as a hard disk, a flash memory, and an optical disk.

The client 110 acquires map information and satellite photograph information provided by the map information providing server 150 and executes processing for displaying the acquired information together with local data, such as photographic images, stored in a storage medium, such as a hard disk. A display structure description file applied in the display processing, for example, an XML file or an HTML file is received from a service providing server (web server) 120. In addition, the display structure description file is not limited to the XML file or HTML file, but display structure description files having various data structures may be applied.

However, in the configuration according to the embodiment of the present invention, the client 110 does not transmit local image data to the service providing server (web server) 120, that is, does not execute processing for uploading the image data to the service providing server (web server) 120. The client 110 does not transmit actual data of images but transmits to the service providing server (web server) 120 path information corresponding to image data, such as image files, stored in the client 110, that is, file path information (for example, c:¥Doc¥fileOOO1.jpg) which is image reference information as access information indicating a storage place, such as a hard disk.

In the processing configuration according to the embodiment of the present invention, a client transmits to the service providing server (web server) 120 path information of an image, photographing position information (for example, latitude and longitude information) as attribution information of an image, photographing date and time information, and the like. On the basis of the information, the service providing server (web server) 120 creates an HTML file (or XML file) applied to the processing for displaying the local image together with a map (or satellite photograph), which is similar to that described above with reference to FIG. 1, and provides the HTML file (or XML file) to the client. The HTML file is recorded with key information provided in advance to the service providing server (web server) 120, information on utilization of API of the map information providing server 150, image file path information, photographing position information (for example, latitude and longitude information) as attribution information of an image, and photographing date and time information, and the like.

The client 110 executes communication with the map information providing server 150 on the basis of the HTML file received from the service providing server (web server) 120, displays a map provided by the map information providing server 150 applying the API that the map information providing server 150 provides, and reads an image stored in the client 110 (for example, hard disk of the client 110) and displays the read image using the file path information described in the HTML file.

Figure 6:
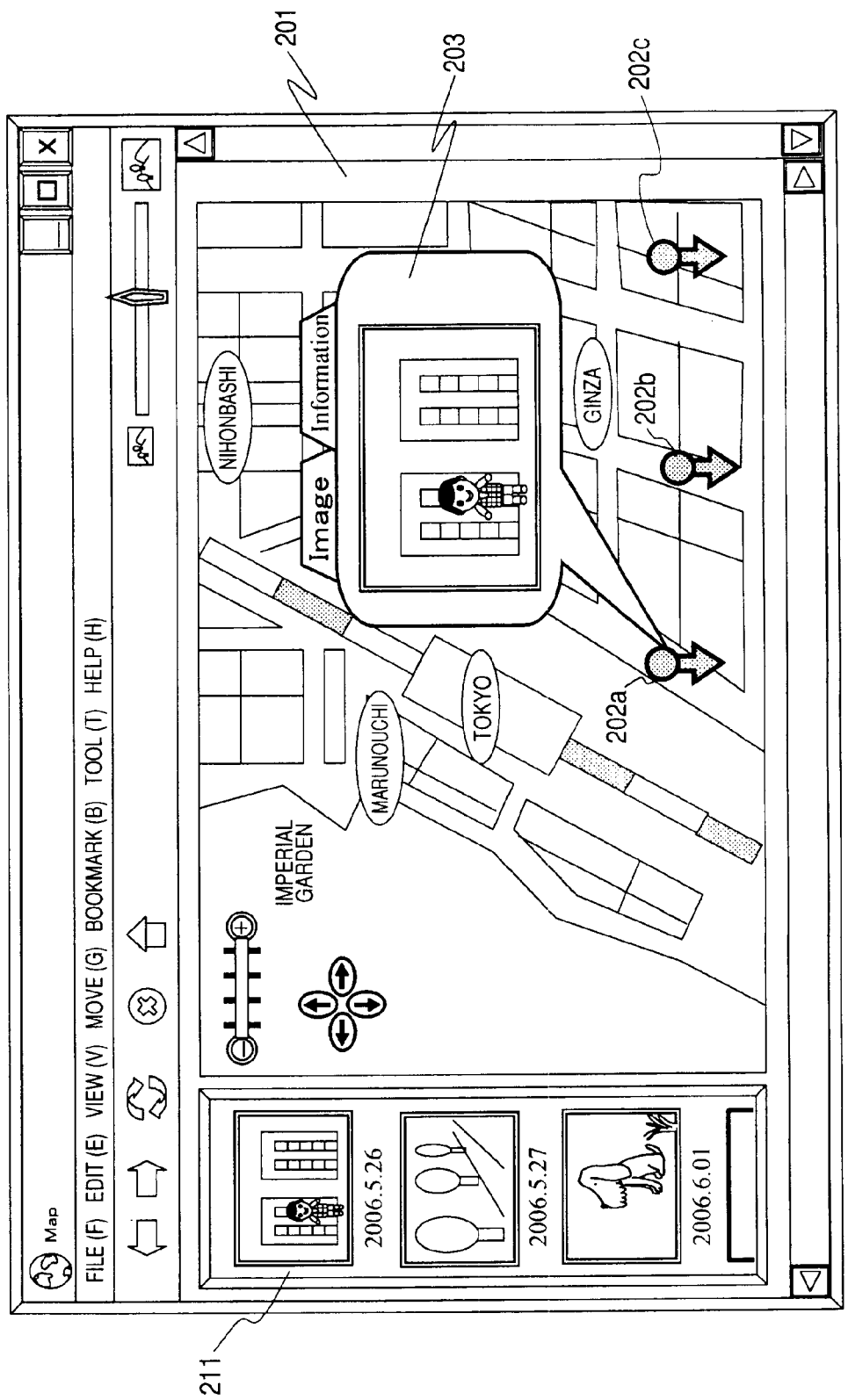
FIG. 6 is a view illustrating an example of display data displayed on a client.

An example of display data displayed on the client 110 is illustrated in FIG. 6. For example, as shown in FIG. 6, markers 202*a* to 202*n* are shown on a map 201 that the map information providing server 150 provides. These markers are set at positions corresponding to position data that a user has transmitted to the service providing server 120 as position information corresponding to an image file.

An image 203 corresponding to a photograph taken by the user pops up when designating (for example, clicking) each marker. The image data displayed here is not data called from the service providing server 120 but data read from the client 110, that is, a storage unit of the client 110 on the basis of the file path information set in the HTML file.

As shown in the drawing, tags such as 'Image' and 'Information' are set on an image 203, and image data read from the client 110, that is, the storage unit of the client 110 on the basis of the image file path or a thumbnail image is displayed on the tag 'Image'. On the tag 'Information', for example, photographing date and time information, latitude and longitude information indicating photographing position, and file path information of original image data are displayed. Such information is data that the client has transmitted to the service providing server 120 together with the image file path and is data recorded in the HTML file that the service providing server has created on the basis of the information.

Moreover, as shown in FIG. 6, an image list 211 including a plurality of images is displayed on display data. The list-displayed image is also data read from the client 110, that is, the storage unit of the client 110 on the basis of the file path information set in the HTML file.

Thus, in the processing configuration according to the embodiment of the present invention, the image data as displayed local data is not read from the service providing server but is read from the storage unit of the client 110 on the basis of the file path information. Therefore, since the client does not need to transmit image data to the service providing server, processing load is reduced and thus data display processing can be performed quickly.

Next, an outline of processing performed by the client 110, the service providing server 120, and the map information providing server 150 in the processing configuration according to the embodiment of the present invention will be described with reference to FIG. 7.

Figure 7:
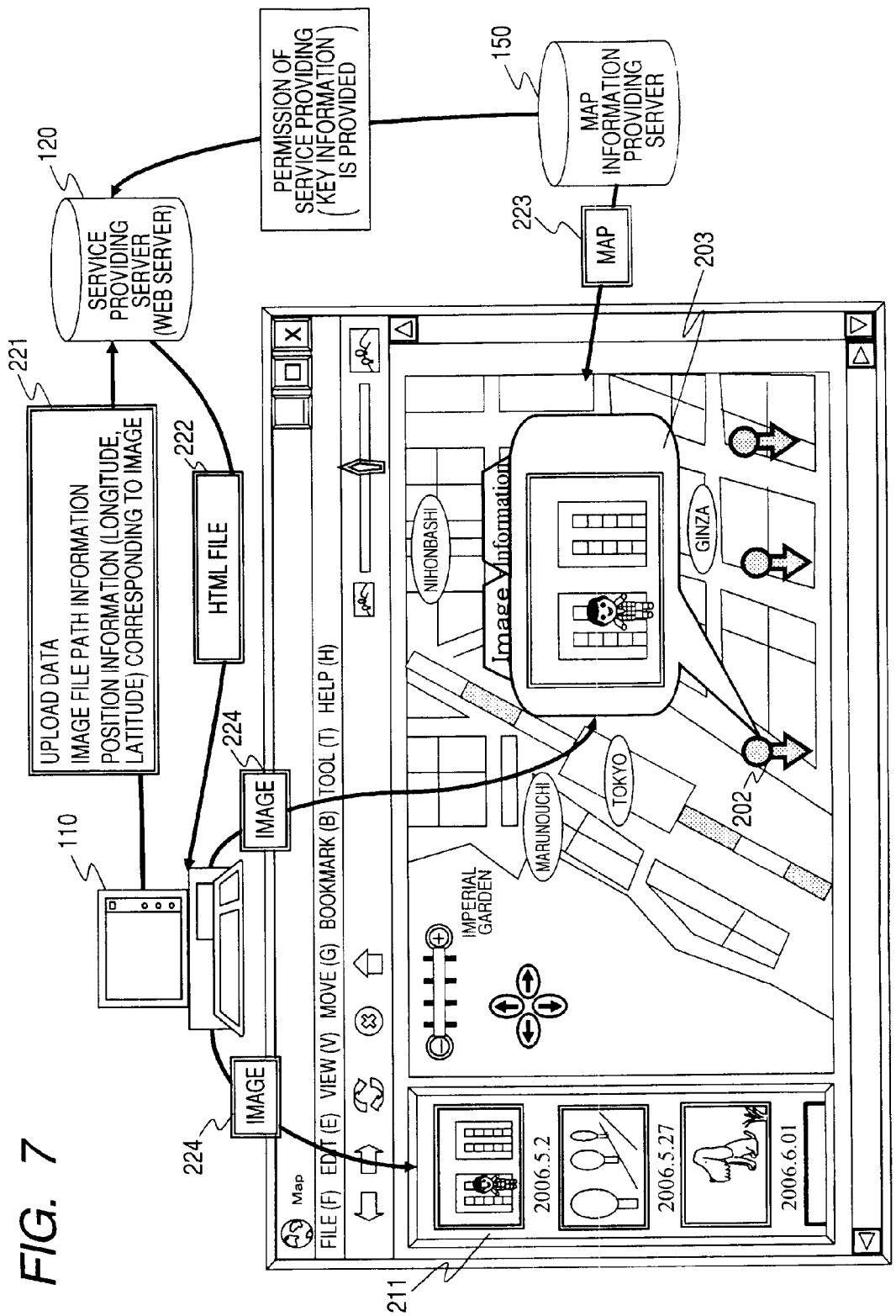
FIG. 7 is a view explaining an example of processing in client and each server of the information processing system according to the embodiment of the present invention.

Referring to FIG. 7, the map information providing server 150 gives to the service providing server 120 a permission to create an HTML file for information display using a map, which is provided by the map information providing server 150, and provide the created HTML file to the client. For example, a service during a predetermined period is permitted by license agreements. In this processing, the map information providing server 150 creates a key for license and provides the key to the service providing server 120.

When receiving the service, the client 110 transmits, that is, uploads to the service providing server 120 image file path information as access information corresponding to image data stored within the client 110, for example, image data, such as photographs taken at tourist spots by a user who operates the client 110, and photographing position and photographing date and time information as attribute information of the image data. Upload data 221 is shown in the drawing.

An example of upload data transmitted from the client 110 to the service providing server 120 is shown in FIG. 8. As shown in FIG. 8, for example, (a) image file path information, (b) image cache path information (file path information on thumbnail image), (c) image position information (longitude, latitude), and (d) image photographing date and time information are included in the upload data transmitted from the client 110 to the service providing server 120.

(a) Image file path information is image file path information as access information corresponding to the image data stored in the client 110, that is, image data, such as photographs taken at tourist spots.

(b) Image cache path information is image file path information as access information of a thumbnail (reduced image) corresponding to an image designated on the basis of the image file path information.

(c) Image position information (longitude, latitude) is position information indicating the photographing position of an image designated on the basis of the image file path information, for example, longitude and latitude information.

(d) Image photographing date and time information is information indicating photographing date and time of an image designated on the basis of the image file path information.

In addition, the image data photographed using a digital camera or the like is recorded in a storage unit of the digital camera in a format of EXIF file, for example. Then, the image data is copied and recorded in a hard disk or the like of the client 110, and path information on each image file is specified according to directory of the hard disk. In addition, path information of an external storage unit, such as a flash memory, connected through USB connection or the like may be applied.

As the position information or the photographing date and time information, data that is recorded as a photographic data file in the EXIF file may be used, or data that is additionally recorded later by the user may be used. In addition, the position information is not limited to the photographing position. For example, the position of a photographic subject, position information related to an image, and the like may be recorded. Such position information is used to determine the position of a marker set on a map.

Further, (b) image cache path information is the image file path information as access information of a thumbnail (reduced image) corresponding to an image designated on the basis of image file path information. In many cases, a thumbnail image read according to the cache path is used as an image that pops up by an operation of a marker on a map or an image displayed as an image list.

The read image is image data that is actually read on a screen. An image that the user holds after proper processing may be used as the read image. For example, an image subjected to rotation processing or an image subjected to resizing processing may be used as the read image.

Furthermore, (a) image file path information is an original image corresponding to (b) image cache path information. The file path information of the original image is recorded in image information data displayed by designating the tag 'Information' of the pop-up image data described above with reference to FIG. 6 and is used in a case when the user desires to display the original image.

In addition, the image information corresponding to (a) image file path information and (b) image cache path information may be dynamic image data without being limited to still images. In this case, for example, a pop-up image displayed on the map by a marker operation is displayed as a dynamic image.

On the basis of data received from the client 110, that is, (a) image file path information, (b) image cache path information (file path information on thumbnail image), (c) image position information (longitude, latitude), and (d) image photographing date and time information, the service providing server 120 shown in FIG. 7 creates an HTML file 222 corresponding to display data displayed on a display unit of the client 110 and provides the HTML file 222 to the client 110.

Figure 3:
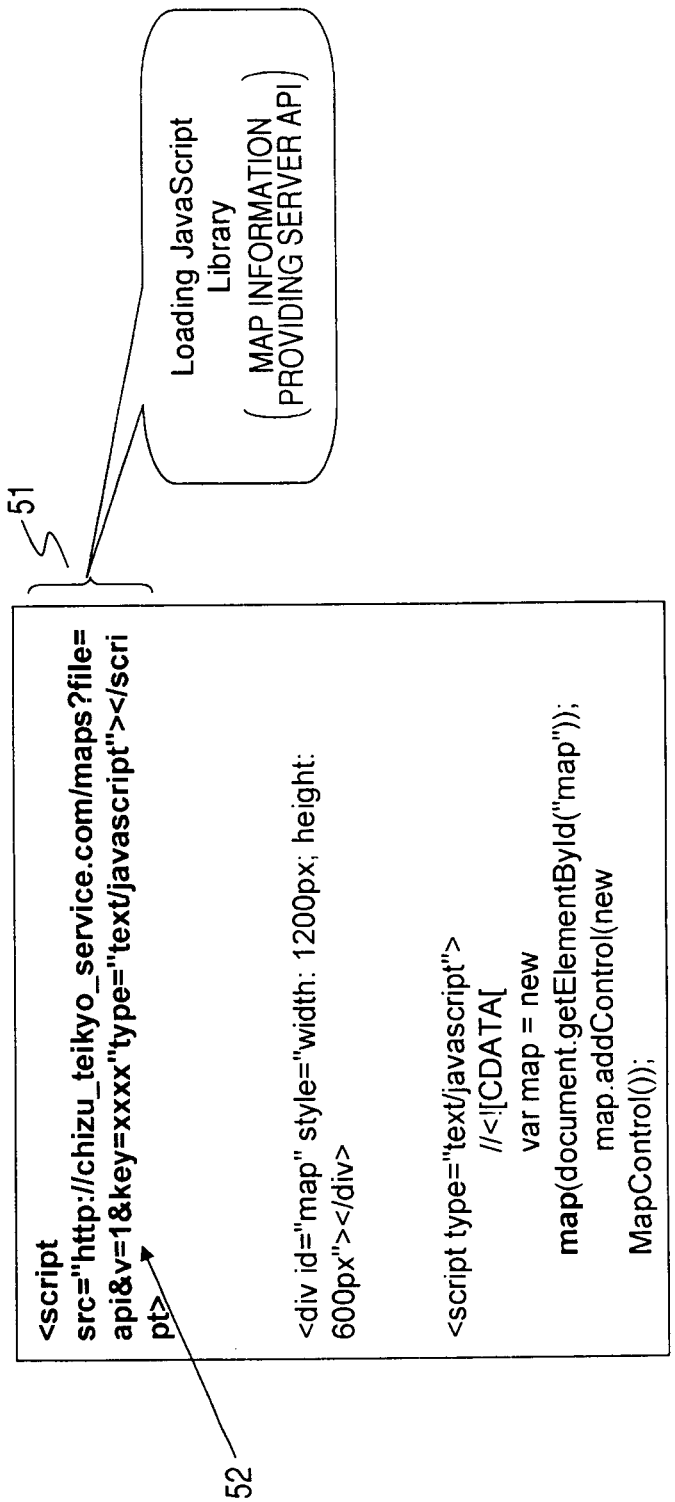
FIG. 3 is a view illustrating the configuration of a part of an HTML file created by a service providing server.
Figure 4:
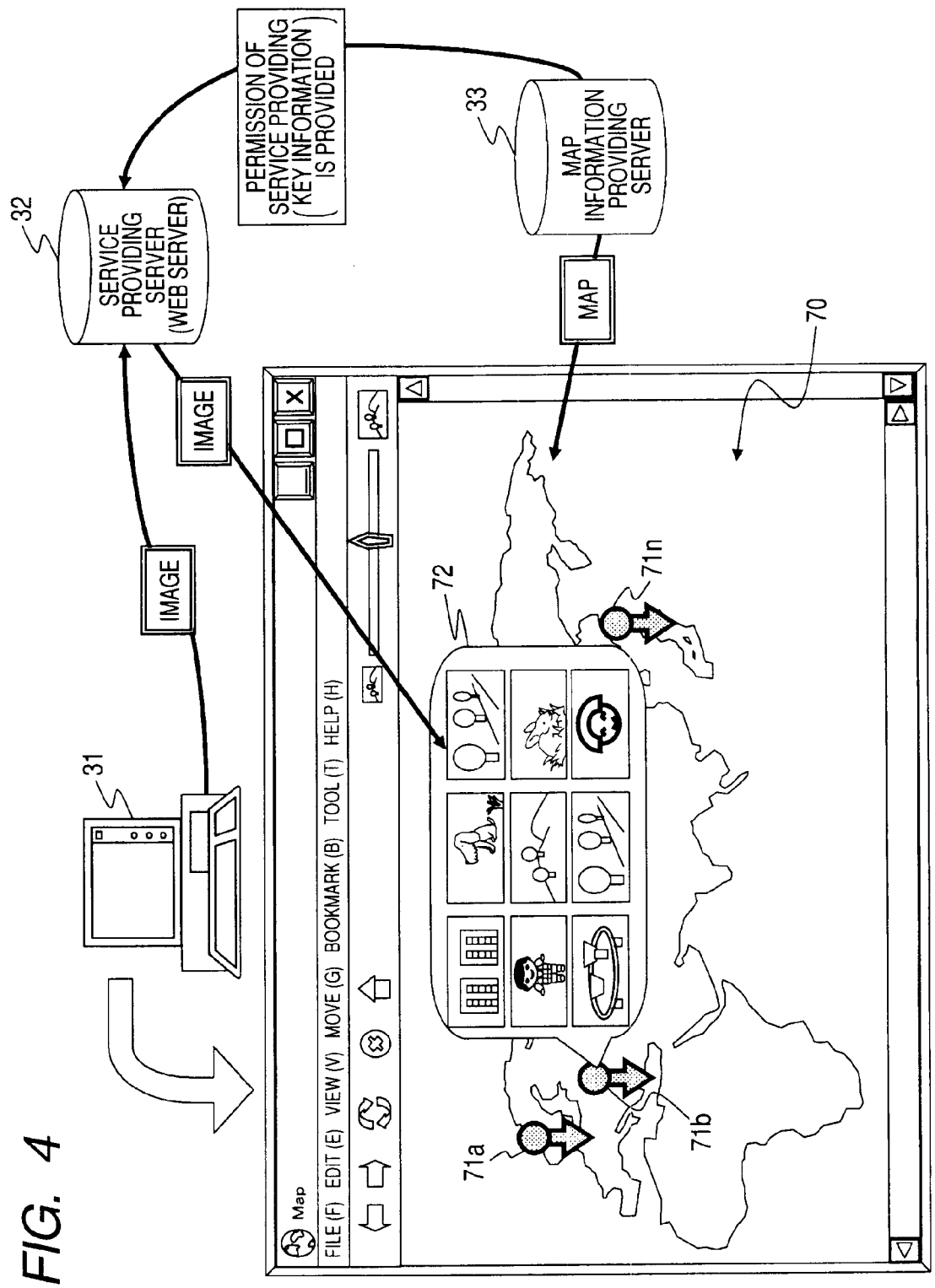
FIG. 4 is a view explaining an example of processing in client and each server.
Figure 9:
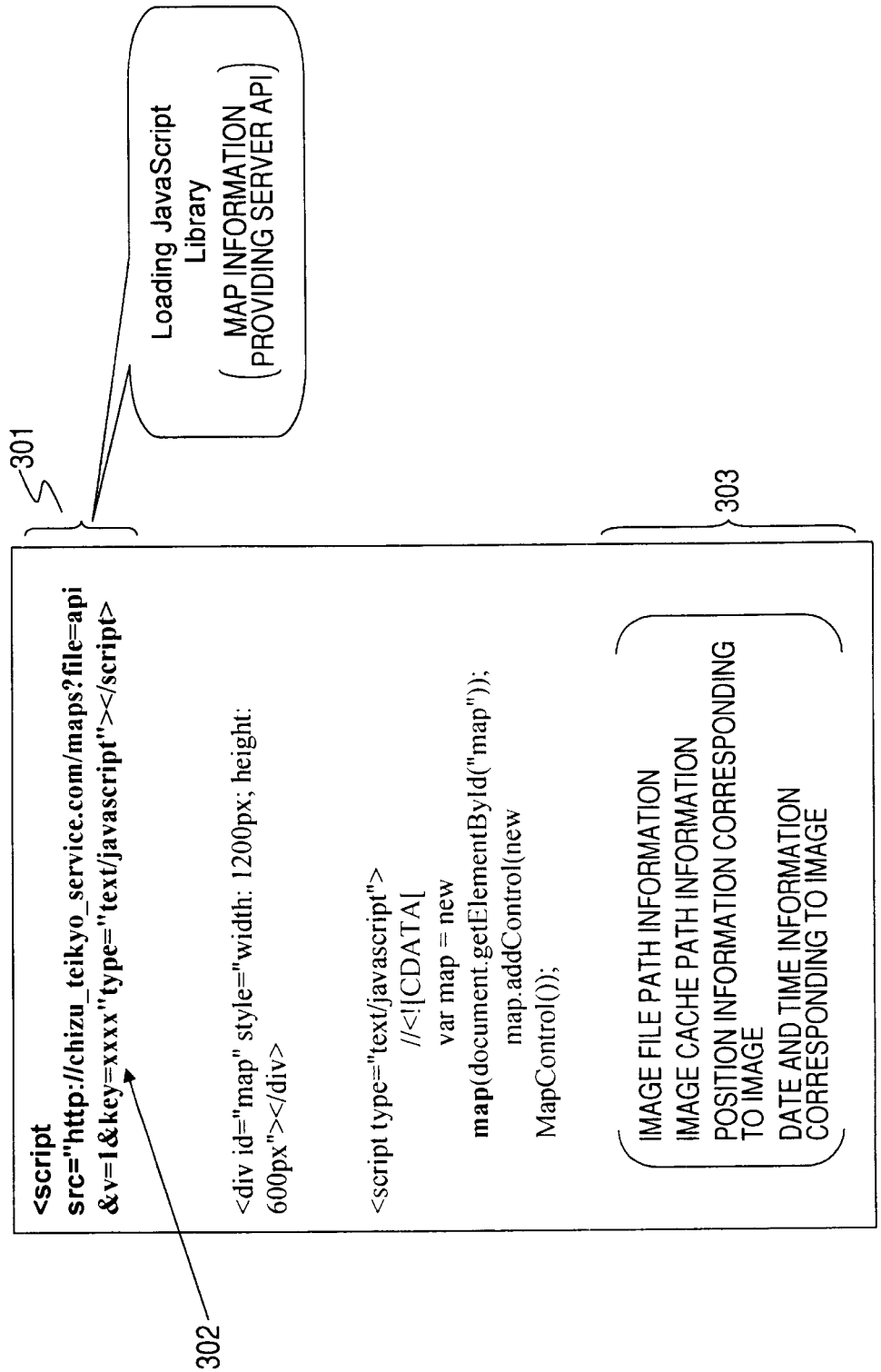
FIG. 9 is a view illustrating an example of an HTML file created by a service providing server.

An example of an HTML file created by the service providing server 120 is shown in FIG. 9. Similar to the HTML file described above with reference to FIG. 3, key information 302 received from the map information providing server 150 (refer to FIG. 7) and code information (Java (registered trademark) script) applied to utilize the API provided by the map information providing server 150 are described in a data part 301 of the HTML file. Further, a data part 303 includes various kinds of data transmitted from the client 110 to the service providing server 120, that is, HTML data configured to include link information, such as (a) image file path information, (b) image cache path information, (c) image position information (longitude, latitude), and (d) image photographing date and time information, and display format information thereof.

(a) image file path information and (b) image cache path information described in the HTML file shown in FIG. 9 are path information as access information of an image or a thumbnail image stored in a storage unit of the client 110. Therefore, the image and the thumbnail image displayed when executing the data display applying the HTML file are read from the client 110 on the basis of the path information recorded in the HTML file.

The client 110 executes API utilization request with respect to the map information providing server 150 on the basis of codes (Java (registered trademark) script) for utilizing the API included in the HTML file 222 received from the service providing server 120. In this processing request, position information for indicating the marker position set on a map and the key information 302 included in the data part 301 of the HTML file shown in FIG. 9 are included.

The map information providing server 150 verifies the key information in response to the request from the client 110. That is, the map information providing server 150 verifies whether or not the request from the client 110 is a map utilization request based on the HTML file created by the service providing server licensed by the map information providing server 150. Specifically, the map information providing server 150 verifies whether or not effective key information, which is provided to the service providing server licensed by the map information providing server 150, is included in the request from the user terminal. If it is verified that the effective key information is not included, the service stops.

On the other hand, if it is verified that the effective key information is included, map data that allows data processing using the API of the map information providing server 150 is provided to the client 110.

That is, as shown in FIG. 7, on the basis of the HTML file 222 received from the service providing server 120, the client 110 can display a map 223 received from the map information providing server 150 and image data and thumbnail image data called from itself, that is, the storage unit of the client 110 according to path information recorded in the HTML file 222.

For example, as shown in FIG. 7, a marker 202 is displayed at the position, which corresponds to a position set as attribution information of an image, on the map and the image corresponding to the marker pops up when clicking on the marker. This processing is processing executed by using the HTML file created by the service providing server 120 and the API of the map information providing server 150, and an image 224 stored in the client 110 is read and displayed according to the file path information described in the HTML file 222.

In addition, in the data display example shown in FIG. 7, the image list display part 211 is set on a left side of a screen, and thumbnail images of which path information is designated when the client 110 requests the service providing server 120 to create the HTML file is displayed on the image list display part 211 in the order of photographing date and time, for example. This image is also the image 224, which is stored in the client 110, read on the basis of the file path information described in the HTML file 222.

In addition, the display example shown in FIGS. 6 and 7 is only an example, and various kinds of data displays are realized according to the HTML file created by the service providing server 120.

Figure 10:
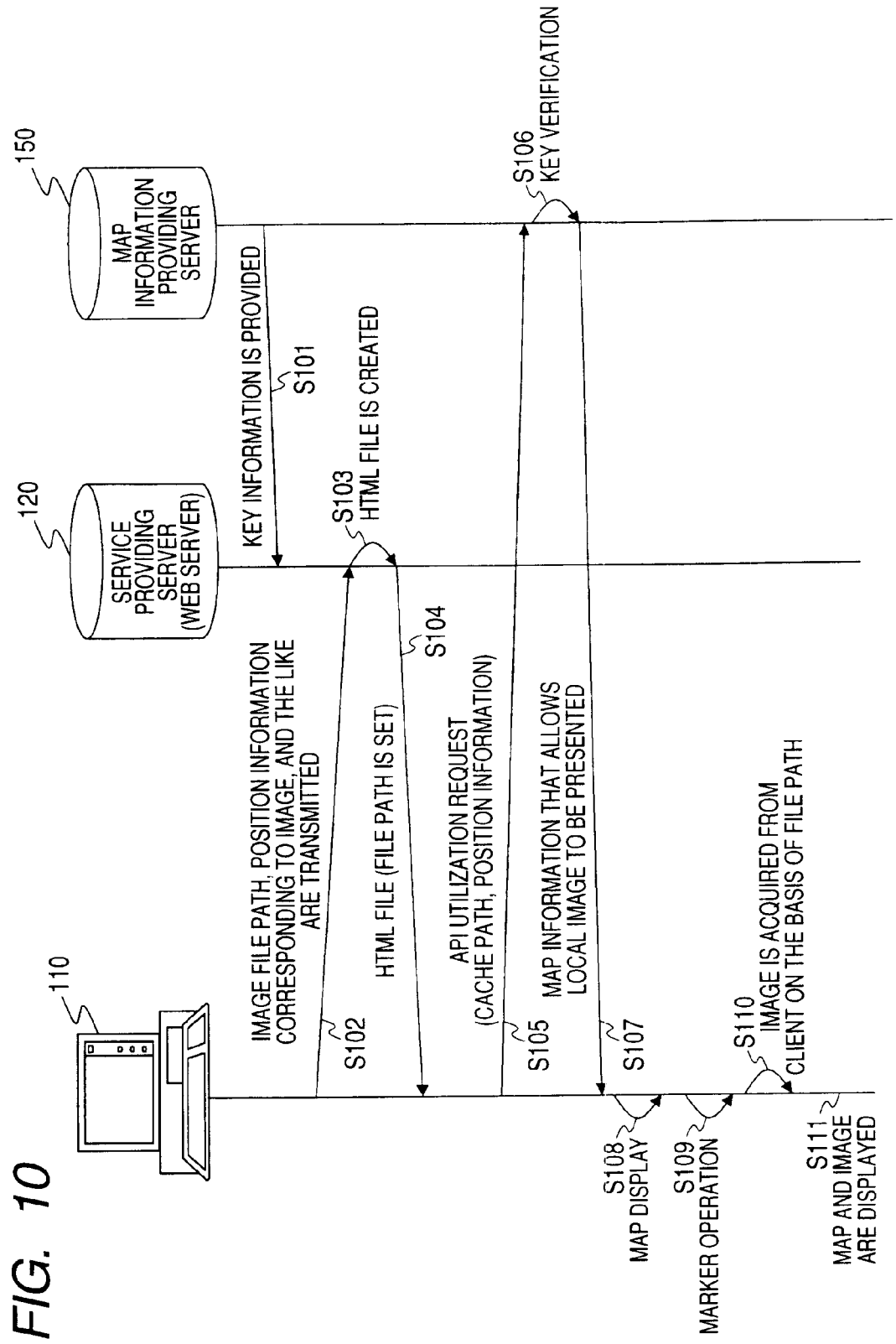
FIG. 10 is a view explaining sequences in which a client executes information display processing on the basis of map information provided by a map information providing server and an HTML file provided by a service providing server, in the configuration according to the embodiment of the present invention.

Hereinafter, sequences in which a client executes information display processing on the basis of map information provided by a map information providing server and an HTML file provided by a service providing server, in the configuration according to the embodiment of the present invention, will be described with reference to FIG. 10. The client (user terminal) 110 that executes display of data, the service providing server 120 that creates an HTML file, and the map information providing server 150 that provides map information or satellite photograph information are shown from the left side in FIG. 10.

First, under the assumption that the service is executed, the map information providing server 150 gives to the service providing server 120 a permission to create an HTML file for information display using a map, which is provided by the map information providing server 150, and provide the created HTML file to the client. For example, a service during a predetermined period is permitted by license agreements. In this processing, in step S101, the map information providing server 150 creates a key for license and provides the key to the service providing server 120.

Then, in step S102, the client (user terminal) 110 that desires to execute the data display transmits, that is, uploads to the service providing server 120 path information corresponding to image data stored in the client (user terminal) 110, that is, path information as access information of image data, such as photographs taken at tourist spots, and photographing position and photographing date and time information as attribute information of the image data. The upload data includes, for example, (a) image file path information, (b) image cache path information (file path information on thumbnail image), (c) image position information (longitude, latitude), and (d) image photographing date and time information, as described above with reference to FIG. 8.

In step S103, the service providing server 120 creates an HTML file for data display. The HTML file is an HTML file applied to the data display described above with reference to FIG. 9. The HTML file includes key information received from the map information providing server 150, codes for executing utilization of the API provided by the map information providing server 150, and various kinds of data transmitted from the client 110 to the service providing server 120, that is, HTML data configured to include link information, such as (a) image file path information, (b) image cache path information, (c) image position information (longitude, latitude), and (d) image photographing date and time information, and display format information thereof.

In step S104, the service providing server 120 transmits the created HTML file to the client 110. Then, in step S105, the client 110 executes the API utilization request with respect to the map information providing server 150 on the basis of the codes (Java (registered trademark) script) for utilizing the API included in the HTML file received from the service providing server 120. In this processing request, data that forms the HTML file received from the service providing server 120, that is, the key information 302 described above with reference to FIG. 9, other image file path information, photographing position as image attribution information, and the like are included.

In step S106, the map information providing server 150 verifies the key information in response to the request from the client 110. That is, the map information providing server 150 verifies whether or not the request from the client 110 is a map utilization request based on the HTML file created by a licensed service providing server licensed by the map information providing server 150. Specifically, the map information providing server 150 verifies whether or not effective key information, which is provided to the service providing server licensed by the map information providing server 150, is included in the request from the user terminal. If it is verified that the effective key information is not included, the service stops.

On the other hand, if it is verified that the effective key information is included, map data that allows data processing using the API of the map information providing server 150 is provided to the client 110 in step S107. That is, the map data is map information in which a marker causing a local image to be presented on the map is set.

In step S108, the client 110 displays a map using a browser function, for example. On the map, a marker (marker 202 in FIG. 7) for pop-up display of an image is set. In step S109, a marker operation, such as an operation of clicking on a marker, is executed. Then, in step S110, an image (or thumbnail image) is acquired from a storage unit of the client 110 on the basis of image file path information described in the HTML file. Then, in step S111, an image that pops up on the map is displayed on the user terminal.

The displayed image is image data stored in a device of the client. Moreover, in the sequence diagram shown in FIG. 10, an example has been described in which image data pops up on the basis of the image file path information described in the HTML file when the marker operation is executed in step S109. However, as described above with reference to FIGS. 6 and 7, the image list 211 including a plurality of images is displayed as the display data. The list-displayed image is also read from the client 110, that is, the storage unit of the client 110 on the basis of the file path information set in the HTML file and is then displayed on a display unit of the client. The display timing of the image list is the same as that of the map display in step S108.

Thus, in the processing configuration according to the embodiment of the present invention, the image data as displayed local data is not read from a service providing server but is read from the client 110, that is, the storage unit of the client 110 on the basis of the file path information. Therefore, since the client does not need to transmit image data to the service providing server, the processing load is reduced and thus data display processing can be performed quickly.

Figure 11:
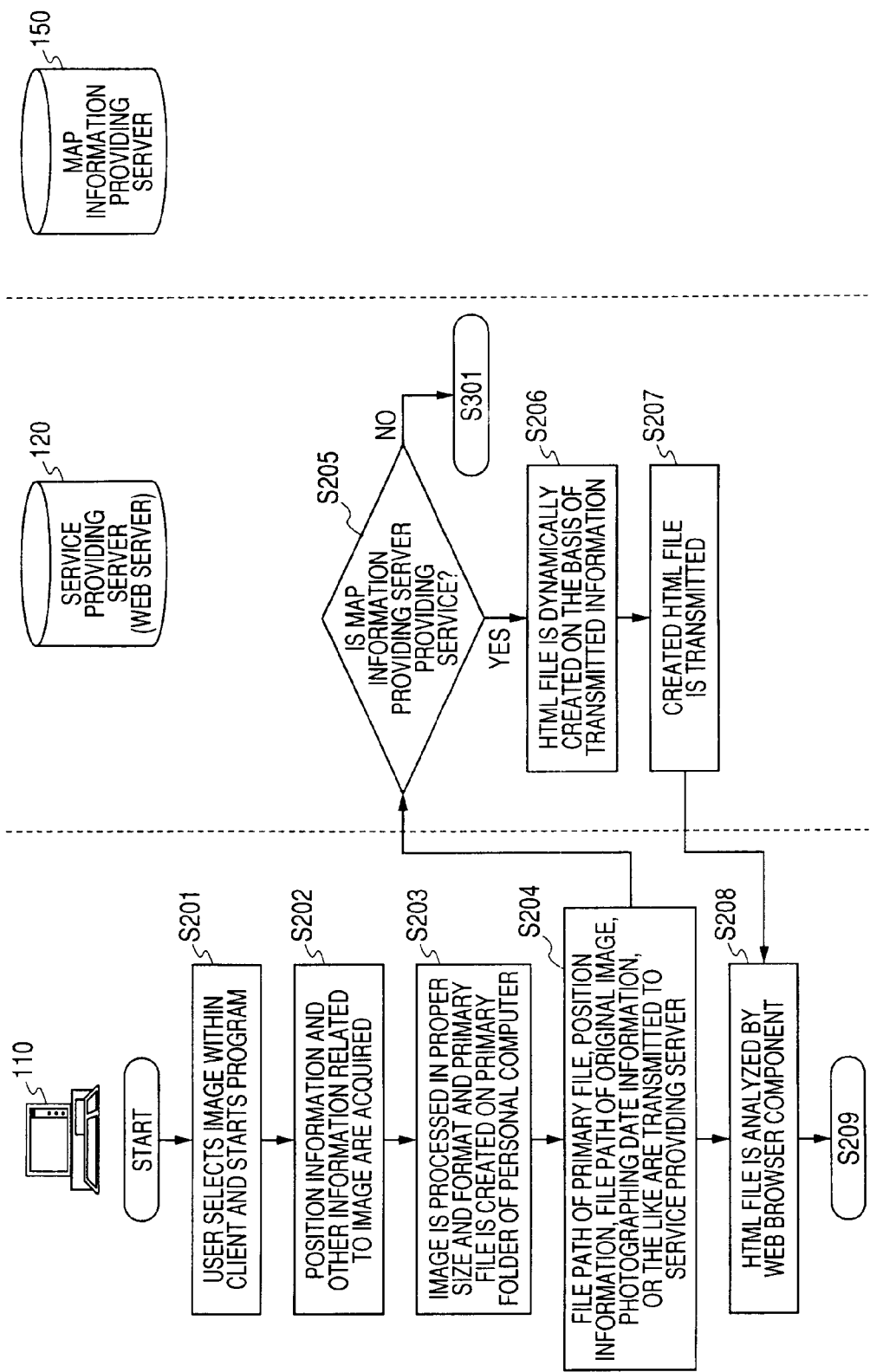
FIG. 11 is a flow chart explaining processing sequences including details of processing in each apparatus.
Figure 12:
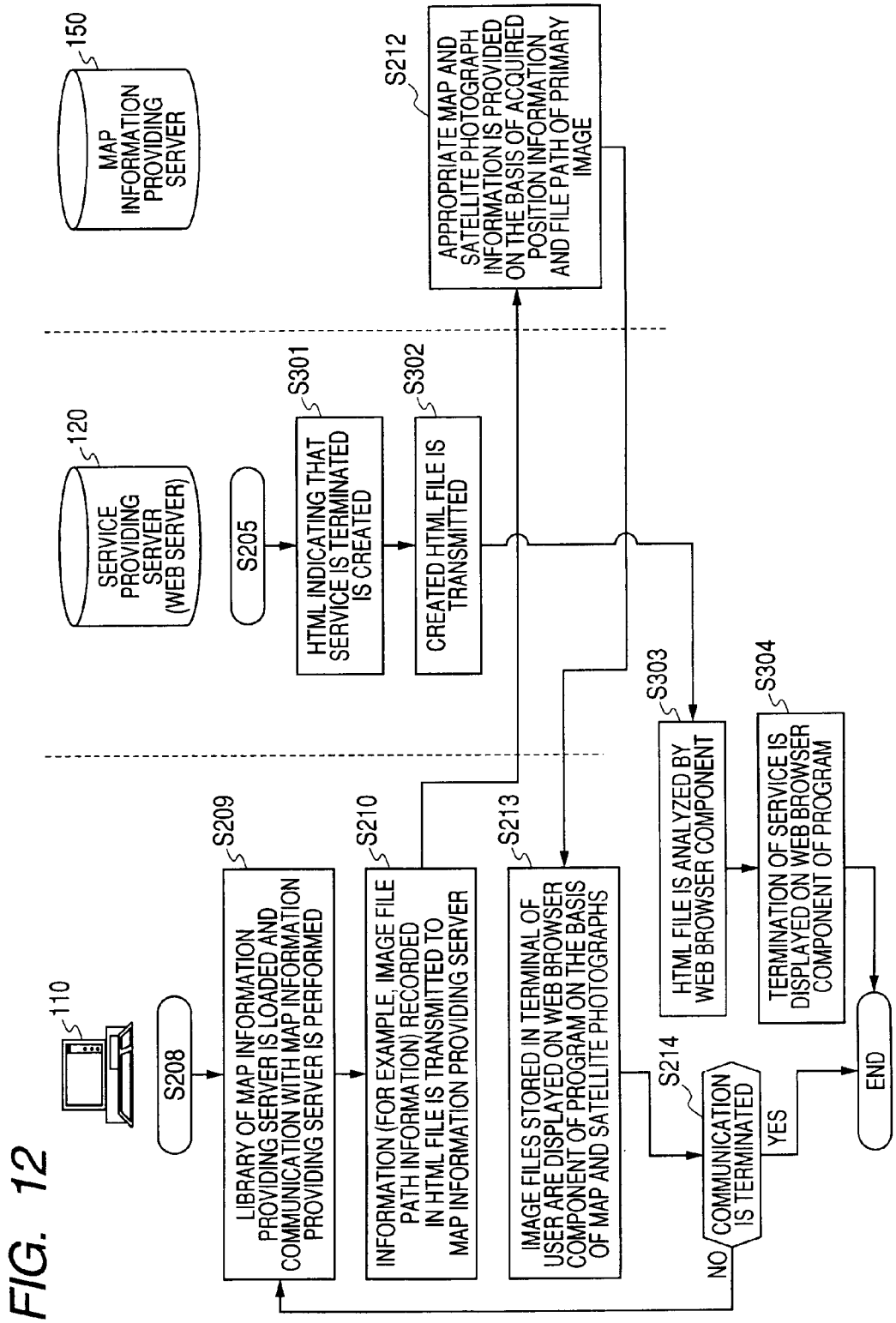
FIG. 12 is a flow chart explaining processing sequences including details of processing in each apparatus.

Next, it will be described about processing sequences including details of processing in each apparatus will be described with reference to flow charts shown in FIGS. 11 and 12. The client (user terminal) 110 that executes display of data, the service providing server 120 that creates an HTML file, and the map information providing server 150 that provides map information or satellite photograph information are shown from the left side in FIGS. 11 and 12.

First, under the assumption that the service is executed, the map information providing server 150 gives to the service providing server 120 a permission to create an HTML file for information display using a map, which is provided by the map information providing server 150, and provide the created HTML file to the client. In addition, it is assumed that the service providing server 120 has already received the key for license from the map information providing server 150.

In step S201, a user of the client 110 executes processing for selecting an image file stored therein. That is, the user selects an image file, which is to be displayed together with a map provided by the map information providing server 150, from the client 110. Moreover, the user starts a program for executing a series of processing, that is, processing for displaying an image as local data together with a map provided by the map information providing server 150. This program is downloaded beforehand from the service providing server 120, for example.

In step S202, processing for acquiring attribution information from an image file selected by the user is performed as processing of a program. The attribution information is photographing position information on an image, photographing date and time information on the image, and the like, for example. As the position information or the photographing date and time information, data recorded in the EXIF file as a photographic data file may be used, or data additionally recorded later by the user may be used. In addition, the position information is not limited to the photographing position. For example, the position of a photographic subject, position information related to an image, and the like may be recorded. Such position information is used to determine the position of a marker set on a map.

In step S203, the client 110 creates an image, such as a thumbnail image, used as an image displayed together with the map and records the created image as a primary file in a primary folder set in the storage unit of the client. The image may be a thumbnail which is a simple reduced image, or may be processed data obtained after the user properly performs design change, message addition, or the like.

In step S204, the client 110 transmits (uploads) to the service providing server 120 various kinds of information applied to create an HTML file, that is, the following information described above with reference to FIG. 8 which are (a) image file path information, (b) image cache path information (file path information on thumbnail image), (c) image position information (longitude, latitude), and (d) image photographing date and time information.

Then, the service providing server 120 checks whether or not the service is being provided by the map information providing server 150 in step S205. If the service is not being provided by the map information providing server 150, the process proceeds to step S301. Processing in step S301 will be described later.

If the service providing server 120 confirms that the service is being provided by the map information providing server 150 in step S205, the service providing server 120 creates an HTML file for display in step S206 by applying the data received from the client 110, that is, (a) image file path information, (b) image cache path information (file path information on thumbnail image), (c) image position information (longitude, latitude), and (d) image photographing date and time information. The HTML file is a file described above with reference to FIG. 9 and includes key information for license checking. Further, image file path information as access information corresponding to the image data stored in the client 110 and image cache path information as access information of the primary file, such as a thumbnail, included in the primary folder created in step S203 are included in the HTML file.

In step S207, the service providing server 120 transmits the created HTML file to the client 110. Then, in step S208, the client 110 analyzes the received HTML file using a browser component of the client 110. Then, in step S209, the client 110 starts communication with the map information providing server 150 on the basis of processing execution request codes for the map information providing server that are included in the HTML file, that is, codes (Java (registered trademark) script) for utilizing the API. Then, in step S210, the client transmits to the map information providing server 150 information recorded in the HTML file, for example, image file path information, image attribute information such as position information, and data related to the key information recorded in the HTML file.

In step S212, the map information providing server 150 verifies the key information included in the data acquired from the client. That is, the map information providing server 150 verifies whether or not the request from the client 110 is a map utilization request based on the HTML file created by the service providing server licensed by the map information providing server 150. Specifically, the map information providing server 150 verifies whether or not effective key information, which is provided to the service providing server 120 licensed by the map information providing server 150, is included in the request from the user terminal. If it is verified that the effective key information is not included, the service stops. On the other hand, if it is verified that the effective key information is included, map data (for example, map or satellite photograph) that allows data processing using the API of the map information providing server 150 is provided to the client 110. That is, in the map information, a marker that causes a local image, which has been described above with reference to FIGS. 6 and 7, to be presented on the map is set.

In step S213, display data based on the information provided by the map information providing server 150 through a browser, that is, a map (or satellite photograph) is displayed on a display unit of the client. The display data is map information in which a marker that causes a local image, which has been described above with reference to FIGS. 6 and 7, to be presented on the map is set. When the user executes a marker operation, such as an operation of clicking on a marker, an image (or thumbnail image) is acquired from a storage unit of the client 110 on the basis of image file path information described in the HTML file and then an image that pops up on the map is displayed.

The displayed image is image data stored in a device of the client. In addition, as described above with reference to FIGS. 6 and 7, an image list including a plurality of images is displayed as the display data. The list-displayed image is also read from the client 110, that is, the storage unit of the client 110 on the basis of the file path information set in the HTML file and is then displayed on a display unit of the client 110.

Then, in step S214, a display continues until the user performs an input of instructing termination of communication, such that the image display corresponding to a user's operation is performed. The display processing is terminated on the basis of the user's input of instructing the termination of communication. In addition, the display information in the client 110 is, for example, information in which the marker is display on the map provided by the map information providing server 150 and the image list is displayed, as described above with reference to FIG. 6. The markers 202a to 202n shown in FIG. 6 are set at positions corresponding to position data that the user has transmitted to the service providing server 120 as position information corresponding to an image file.

An image corresponding to a photograph taken by the user pops up when designating (for example, clicking) each marker. The image data displayed here is a thumbnail image stored in a primary file, for example. The image displayed on the image list 211 shown in FIG. 6 is also a thumbnail image. The image data displayed here is not data called from the service providing server 120 but data read from the client 110, that is, a storage unit of the client 110 on the basis of the file path information set in the HTML file.

As described above with reference to FIG. 6, tags such as 'Image' and 'Information' are set on the image 203 shown in FIG. 6, and a thumbnail image or image data read from the client 110, that is, the storage unit of the client 110 on the basis of the image file path is displayed on the tag 'Image'. For example, in the case when the display image is set as a thumbnail image, information in which image file path information of an original image is set as link information is recorded as 'Information', and the original image is called from the client and is then displayed by operating (clicking) the information.

As described above, on the tag 'Information', for example, photographing date and time information, latitude and longitude information indicating photographing position, and file path information of original image data are displayed. Such information is data that the client has transmitted to the service providing server 120 together with the image file path and is data recorded in the HTML file that the service providing server has created on the basis of the information.

Then, it will be described about processing in a case in which the service providing server 120 has confirmed that the service is not being provided by the map information providing server 150 in step S205 of FIG. 11. In this case, the service providing server 120 creates an HTML file including a message indicating that the service is terminated in step S301 and then transmits the created HTML file to the client 110 in step S302.

In the client 110, the received HTML file is analyzed by the browser component of the client 110 in step S303. Then, in step S304, the message indicating that the service included in the HTML file is terminated is displayed so as to be checked by the user, terminating the processing.

As described above, in the processing configuration according to the embodiment of the present invention, the image data that is displayed together with map information on the client side is not read from a service providing server but is read from the client, that is, a storage unit of the client on the basis of the file path information recorded in the HTML file. Therefore, since the client does not need to transmit image data to the service providing server, the processing load is reduced and thus data display processing can be performed quickly.

Figure 13:
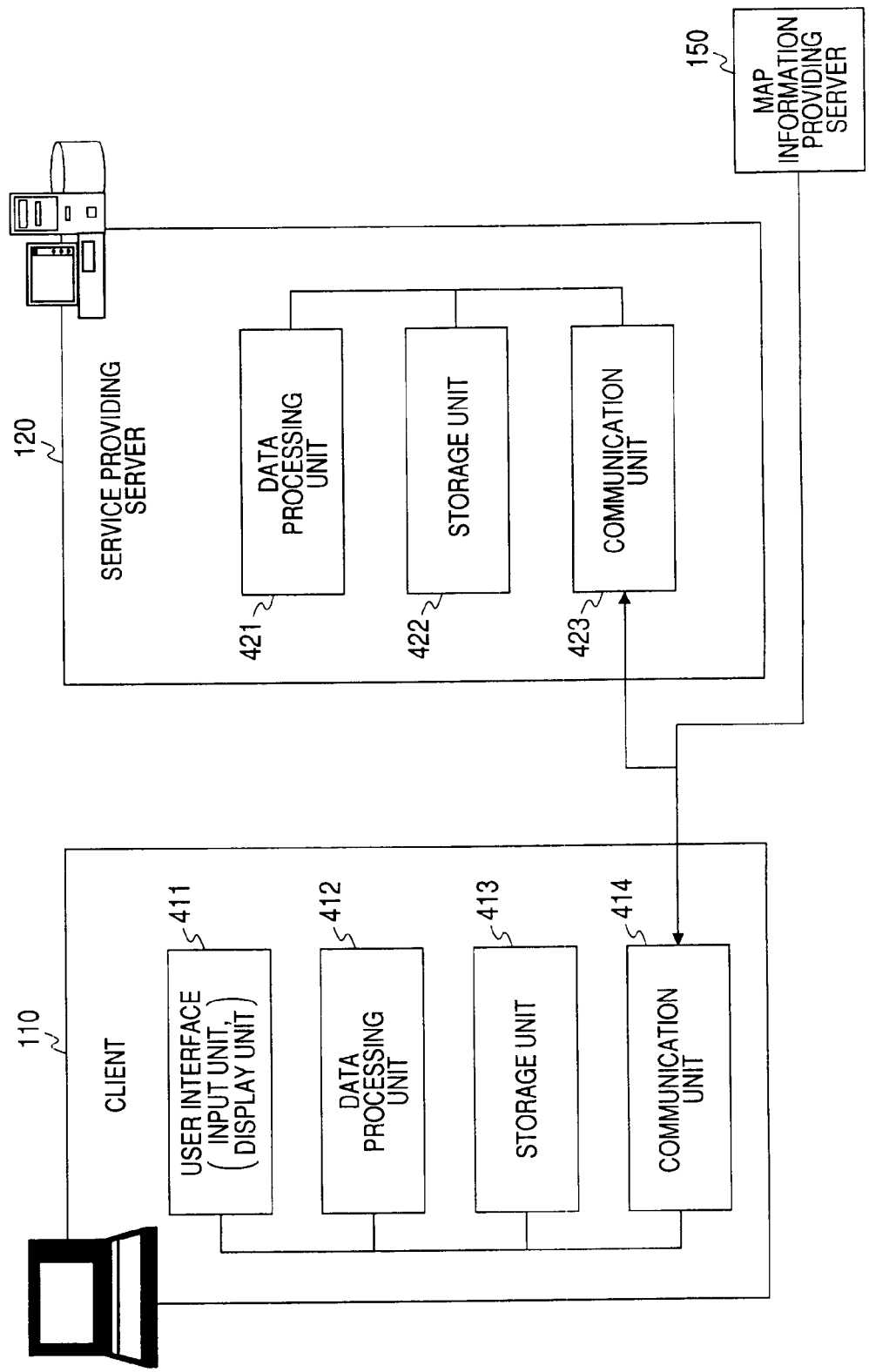
FIG. 13 is a view explaining the functional configuration of each information processing apparatus.

Hereinafter, it will be described about the functional configuration of apparatuses that execute the above processing with reference to FIG. 13. FIG. 13 is a block diagram illustrating the configuration of one client 110 connected to a network and the service providing server 120. The client 110 includes a user interface 411 as data I/O unit, a data processing unit 412, a storage unit 413, and a communication unit 414, and the service providing server 120 includes a data processing unit 421, a storage unit 422, and a communication unit 423. These apparatuses have the same hardware configuration as a general PC. A specific example of the hardware configuration will be described later.

An image file is recorded in the storage unit 413 of the client 110. The image file is recorded as a file based on the EXIF format, for example. In addition, position information, date and time information, and the like as attribution information corresponding to images, are recorded in the image file. Further, image data such as a thumbnail created as a primary file and a program for executing the processing described above are stored in the image file. In addition, the storage unit 413 of the client 110 may be replaced with a removable storage unit that can be detachably mounted in the client 110.

The data processing unit 412 is configured to include a CPU for executing a program and executes the client-side processing described with reference to FIGS. 10 to 12. For example, the data processing unit 412 acquires data for creation of an HTML file, that is, (a) image file path information, (b) image cache path information (file path information on thumbnail image), (c) image position information (longitude, latitude), and (d) image photographing date and time information; transmits the above information to the service providing server 120 to output the HTML file creation request; executes processing for acquiring map information, such as a map or a satellite photograph, from the map information providing server 150 on the basis of information recorded in the acquired HTML file; and executes processing for displaying the map information on a display unit and processing for acquiring an image file from a storage unit on the basis of the image file path recorded in the HTML file and then displaying the acquired image file on the display unit.

The user interface 411 includes a display unit serving as a user input unit and a data output unit and performs output of the display information, which has been described above with reference to FIGS. 6 and 7, as data output processing. In addition, the client 110 performs communication with the service providing server 120 and the map information providing server 150 through the communication unit 414 under the control of the data processing unit 412, receives an HTML file from the service providing server 120, and acquires a map, a satellite photograph, and the like from the map information providing server 150 and displays the acquired map or satellite photograph on the display unit of the user interface 411.

Furthermore, the data processing unit 412 transmits position information corresponding to an image file designated by the image file path, as data for creation of an HTML file, to the service providing server 120. In addition, the data processing unit 412 executes processing for displaying map information, which includes a marker indicating the position information corresponding to the image file, on the display unit on the basis of the HTML file received from the service providing server. In addition, the data processing unit 412 executes processing for acquiring an image file from the storage unit 413 of the client 110 according to the image file path recorded in the HTML file on the basis of an operation of a corresponding marker and displaying the acquired image file on the display unit.

In addition, the display image can be used as a processed image, such as a thumbnail image, by using recording of HTML as a file path corresponding to the processed image, such as a thumbnail image.

On the other hand, the service providing server 120 includes the data processing unit 421, the storage unit 422, and the communication unit 423. In addition, the service providing server 120 receives (a) image file path information, (b) image cache path information (file path information on thumbnail image), (c) image position information (longitude, latitude), and (d) image photographing date and time information from the client 110 through the communication unit 423. In addition, the data processing unit 421 creates the HTML file described above with reference to FIG. 9. A program required for processing for creating the HTML file is stored in the storage unit 422. In the storage unit 422, key data received from the map information providing server 150 is also stored, and an HTML file in which the key information is recorded is created at the time of creating an HTML file. The created HTML file is transmitted to the client 110 through the communication unit 423.

Finally, the hardware configuration of information processing apparatuses that realize a client and a service providing server included in a system that executes the above processing will be described with reference to FIG. 14. A CPU (central processing unit) 501 functions as a main execution body of the data processing unit, which has been described in the above embodiment, executing processing corresponding to OS (operating system). The CPU 501 performs creation or analysis of an HTML file, information display processing, execution of Java (registered trademark) script, data communication processing control, and the like. Such processing is executed according to a computer program stored in a data storage unit, such as a ROM or a hard disk, of each information processing apparatus.

A ROM (read only memory) 502 serves to store a program, computation parameters, and the like that the CPU 501 uses. A RAM (random access memory) 503 serves to store a program used at the time of execution of the CPU 501, parameters that appropriately vary in the execution, and the like. The CPU 501, the ROM 502, and the RAM 503 are connected to one another by a host bus 504, such as a CPU bus.

The host bus 504 is connected to an external bus 506, such as a PCI (peripheral component interconnect/interface) bus, through a bridge 505.

A keyboard 508 and a pointing device 509 serves as input devices operated by a user. A display 510 is a liquid crystal display or a CRT (cathode ray tube) and serves to display various kinds of information in a text or an image.

A HDD (hard disk drive) 511 includes a hard disk therein, drives the hard disk, and records or reproduces a program or information executed by the CPU 501. The hard disk is used as a storage unit that stores image information, image attribution information, and the like, and stores various kinds of computer programs, such as a data processing program.

A drive 512 reads data or a program recorded in a removable recording medium 521 mounted thereon, such as a magnetic disk, an optical disk, a magneto-optic disk, or a semiconductor memory, and transmits the read data or program to the RAM 503 connected thereto through an interface 507, the external bus 506, the bridge 505, and the host bus 504.

A connection port 514 is a port for connection with an externally connected device 522 and has connecting parts, such as USB and IEEE1394. The connection port 514 is connected to the CPU 501 or the like through the interface 507, the external bus 506, the bridge 505, and the host bus 504. A communication unit 515 is connected to a network and executes communication with a client or a network-connected server.

In addition, the example of the hardware configuration of the information processing apparatus shown in FIG. 14 is an example of an apparatus configured by applying a PC, but the system according to the embodiment of the present invention is not limited to the configuration shown in FIG. 14. For example, other apparatuses capable of executing the processing described in the above embodiment may be applied.

Hereinbefore, the specific embodiment of the present invention has been described in detail. However, it is apparent to those skilled in the art that various modifications or substitutions of the above embodiment may be made without departing from the spirit and scope of the present invention. That is, since the present invention has been disclosed in the form of only illustration, the present invention should not be interpreted restrictively. Thus, the scope of the present invention should be determined on the basis of the appended claims.

Further, the series of processing described in the specification may be executed by hardware, software, or a composite configuration of both hardware and software. In the case of executing the processing by the use of software, a program that records processing sequences may be installed in a memory within a computer built in dedicated hardware so as to be executed, or the program may be installed in a general-purpose computer capable of executing various kinds of processing so as to be executed.

For example, a program may be recorded beforehand in a hard disk or a ROM (read only memory) serving as a recording medium. Alternatively, a program may be temporarily or permanently stored (recorded) in a removable recording medium including a flexible disc, a CD-ROM (compact disc read only memory), a MO (magneto optical) disc, a DVD (digital versatile disc), a magnetic disc, and a semiconductor memory. Such removable recording medium may be supplied as so-called package software.

Alternatively, in addition to installing a program from the removable recording medium in a computer, the program may be wirelessly transmitted from a download site to the computer or wire-transmitted from the download site to the computer through a network, such as a LAN (local area network) or Internet. Then, the computer may receive the program that is wirelessly transmitted or wire-transmitted as described above and then install the program in a recording medium, such as a hard disk provided therein.

Furthermore, the variety of processing described in the specification may be executed not only in a time-sequential manner but in parallel or separately according to a processing ability of an apparatus that executes the processing or according to the necessity. Furthermore, the system in the specification is a logic group of a plurality of apparatuses. That is, the system in the specification is not limited to a system in which apparatuses having respective configurations exist in the same casing.

As described above, according to the configuration according to the embodiment of the present invention, local data, such as a photograph, stored in a client (user terminal) can be displayed together with, for example, map information provided by map information providing server without transmitting the local data to an external server or the like. A client transmits image file path information, which is not actual data of an image file but access information of the image file stored in a storage unit of the client, to a service providing server that executes HTML file creation processing and acquires an HTML file including the image file path information. The client executes processing for displaying the image file together with the map on the basis of the HTML file including the image file path information. With the configuration described above, the image data that is displayed together with map information on the client side is not read from the service providing server but is read from the client, that is, the storage unit of the client on the basis of the file path information recorded in the HTML file. Therefore, since the client does not need to transmit image data to the service providing server, the processing load is reduced and thus data display processing can be performed quickly.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus that executes information display processing, comprising:
    a data processing unit configured to generate image data reference information identifying a location of an image data in a storage unit,
    the data processing unit generating a description file including the image data reference information and transmitting the description file to a server,
    the data processing unit displaying map information on a display unit using a display structure description file received from the server and displaying, in conjunction with the map information, image data corresponding to the image data reference information included in the display structure description file,
    wherein the data processing unit transmits position information corresponding to the image data designated by the image data reference information in the description file to the server, and displays the information including a marker indicating the position information corresponding to the image data according to the display structure description file received from the server.

2. The information processing apparatus according to claim 1, wherein the display structure description file is an HTML file.

3. The information processing apparatus according to claim 1, wherein the storage unit is a removable storage unit configured to be detachably mounted in the information processing apparatus.

4. The information processing apparatus according to claim 1, wherein the data processing unit acquires reduced image data reference information identifying a location of reduced images corresponding to the image data stored in the storage unit and includes the reduced image data reference information in the description file, the data processing unit displaying the map information on the display according to the display structure description file in conjunction with the reduced image data identified by the reduced imaged data reference information.

5. The information processing apparatus according to claim 1, wherein the data processing unit transmits data included in the display structure description file to a map information providing server, and acquires map information from the map information providing server in response, the data processing unit displaying the acquired map information on the display unit.

6. An information processing apparatus that creates a display structure description file on the basis of data received from a client, comprising:
   a communicating unit configured to receive a description file including image data reference information generated by the client, the image data reference information identifying a location of image data in a storage unit of the client; and
   a data processing unit configured to create the display structure description file for displaying image data in conjunction with map information according to the description file, the data processing unit integrating the image data reference information in the display structure description file, the data processing unit transmitting the display structure description file to the client through the communication unit,
   wherein the data processing unit creates a display structure description file including position information corresponding to image data received from the client and transmits the created display structure description file to the client.

7. The information processing apparatus according to claim 6, wherein the display structure description file is an HTML file.

8. The information processing apparatus according to claim 6, wherein the data processing unit creates a display structure description file for displaying reduced image data in conjunction with the map information according to a data description file including reduced image data reference information identifying a location of the reduced image data on the storage unit of the client, the data processing unit transmitting the display structure description file to the client.

9. An information processing method executed in an information processing apparatus, comprising:
   generating, in a data processing unit, image data reference information identifying a location of image data stored in a storage unit of the information processing apparatus;
   generating, in the data processing unit, a description file including the image data reference information;
   transmitting the description file;
   displaying map information on a display unit according to a display structure description file received;
   acquiring image data from the storage unit in accordance with the image data reference information recorded in the display structure description file; and
   displaying the image data on the display unit in conjunction with the map information,
   wherein position information corresponding to the image data designated by the image data reference information in the description file is transmitted, and the information including a marker indicating the position information corresponding to the image data according to the received display structure description file is displayed.

10. An information processing method of causing an information processing apparatus to execute a method comprising:
   receiving, in a communicating unit, a description file including image data reference information, the image data reference information identifying a location of image data stored in a storage unit;
   creating, in a data processing unit, a display structure description file for displaying imaged data in conjunction with map information according to the description file, the image data being designated by the imaged data reference information, the image data reference information being integrated into the display structure description file; and
   transmitting, from the communication unit, the display structure description file,
   wherein a display structure description file including position information corresponding to image data received is created and the created display structure description file is transmitted.

11. A non-transitory computer-readable medium storing computer-readable instructions thereon, the computer-readable instructions when executed by a processor of an information processing apparatus cause the processor to perform a method comprising:
   generating image data reference information identifying a location of image data stored in a storage unit of the information processing apparatus;
   generating a description file including the image data reference information;
   transmitting the description file from the information processing apparatus to a server;
   displaying map information on a display unit according to a display structure description file received from the server;
   acquiring image data from the storage unit in accordance with the image data reference information recorded in the display structure description file; and
   displaying the image data on the display unit in conjunction with the map information,
   wherein position information corresponding to the image data designated by the image data reference information in the description file is transmitted, and the information including a marker indicating the position information corresponding to the image data according to the received display structure description file is displayed.

12. A non-transitory computer-readable medium storing computer-readable instructions thereon, the computer-readable instructions when executed by a processor of an information processing apparatus cause the processor to perform a method comprising:
   receiving a description file including image data reference information generated by a client, the image data reference information identifying a location of image data stored in a storage unit of a client;
   creating a display structure description file for displaying image data in conjunction with map information according to the description file, the image data being designated by the image data reference information, the image data reference information being inserted in the display structure description file; and
   transmitting the display structure description file to the client,
   wherein a display structure description file including position information corresponding to image data received from the client is created and the created display structure description file is transmitted to the client.

13. The information processing apparatus according to claim 1, wherein the map information includes satellite photographs and aerial photographs.

14. The information processing apparatus according to claim 1, wherein the position information includes a latitude and a longitude at which the image data was captured.

* * * * *